United States Patent

Nakamura et al.

[11] Patent Number: 4,676,004
[45] Date of Patent: Jun. 30, 1987

[54] AUTOMATIC MARKING DEVICE FOR LENSMETER

[75] Inventors: Shinichi Nakamura, Gyoda; Hideo Tomoda, Kawaguchi; Nobuo Kochi, Tokyo, all of Japan

[73] Assignee: Tokyo Kogaku Kikai Kabushiki Kaisha, Tokyo, Japan

[21] Appl. No.: 784,845

[22] Filed: Oct. 4, 1985

[30] Foreign Application Priority Data

Oct. 11, 1984 [JP] Japan .................. 59-213069

[51] Int. Cl.⁴ .................... G01B 9/08; A61B 3/10
[52] U.S. Cl. .................................. 33/507; 33/28; 33/200
[58] Field of Search .................. 33/28, 200, 507

[56] References Cited

U.S. PATENT DOCUMENTS 1,164,795 12/1915 Emerson .
2,803,995 8/1957 Gunter, Jr. et al. .
3,870,415 3/1975 Cornsweet .
4,115,924 9/1978 Kleinkopf .

Primary Examiner—William D. Martin, Jr.
Attorney, Agent, or Firm—Brumbaugh, Graves, Donohue & Raymond

[57] ABSTRACT

An automatic marking device for a lensmeter comprising: a lens support member; a lens holder having a lens holding member cooperative with the lens supporting member for clamping therebetween the lens movably in a plane substantially perpendicular to a measuring optical axis of the lensmeter; a marking device having a marking unit movably mounted on the lens holder and having at least one marking stylus. The marking unit is carried for rotation about an axis which is parallel to the measuring optical axis. Two hands having inner surfaces are provided and adapted for contacting adjacent edges of the lens such as to clamp the lens therebetween. A hand moving device is provided for moving the hands in the plane in accordance with the result of measurement of the refraction characteristics of the lens.

11 Claims, 37 Drawing Figures

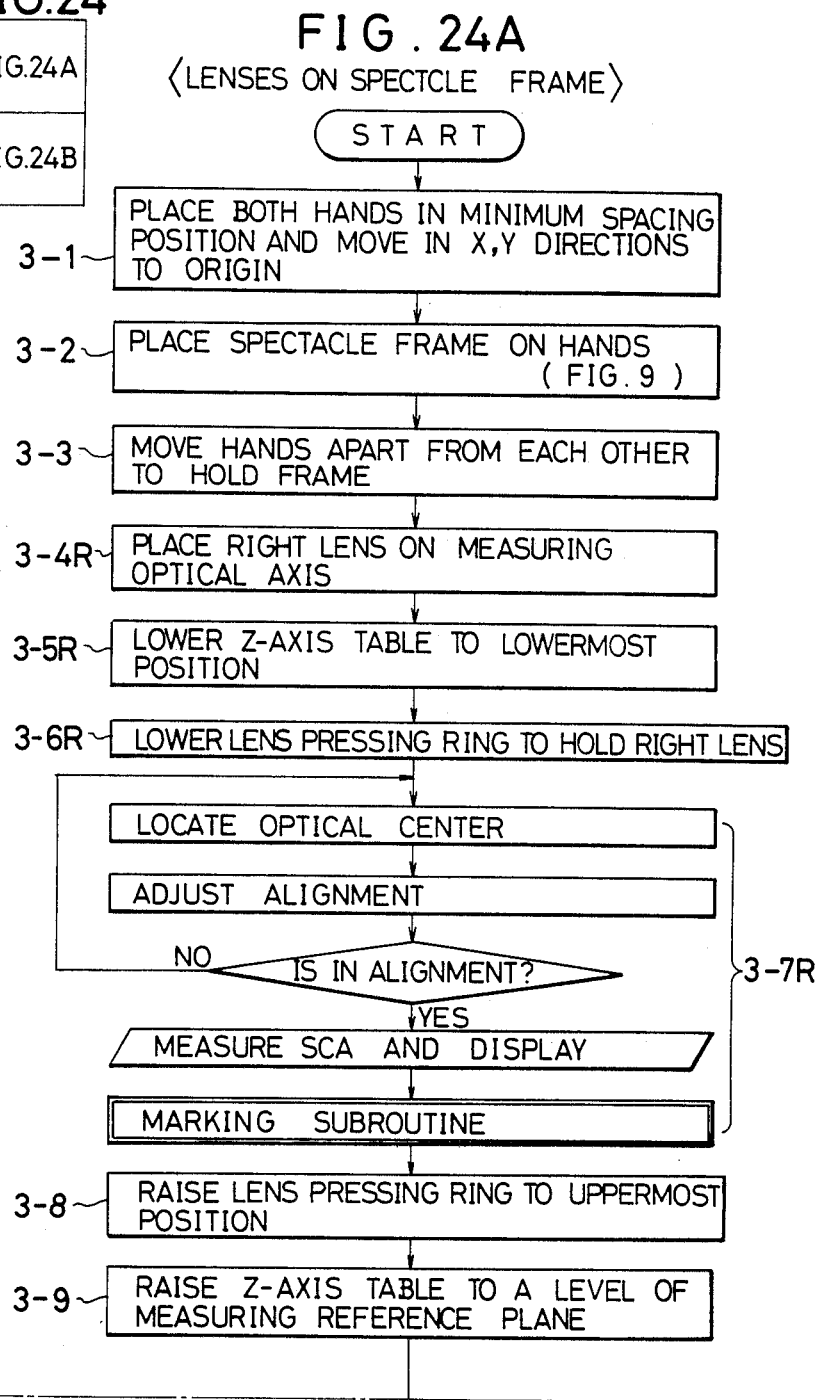

AUTOMATIC MARKING DEVICE FOR LENSMETER

BACKGROUND OF THE INVENTION

1. Field of the Invention

The present invention relates to an automatic marking device for a lensmeter which is used for measuring the refractive characteristics of spectacle lenses.

2. Description of the Prior Arts

A lensmeter generally has two major functions, namely, a measuring function for measuring the refractive characteristics, such as spherical refractive index, cylindrical refractive index, axis angle and prism refractive index of a lens, and a marking function for marking the optical center and the cylindrical axis in the unedged lens as the references for edging the lens to have the same fitted to a spectacle frame.

In recent years, automatic lensmeters capable of automatically measuring the refractive characteristics have been put into the practical use. These automatic lensmeters, however, are not able to conduct the marking automatically and the marking has to be done manually even in these automatic lensmeters.

The difficulty encountered in the manual marking operation is attributable to the fact that this operation includes two kinds of work, namely, aligning and marking. The aligning work is the work for attaining optical alignment between the optical center of the lens or the optical point of action with the measuring axis of the lensmeter. Any misalignment will lead to an error in the measured values of refractive indexes. Since the making stylus of a lensmeter is adapted to be moved to a position on the measuring axis and to effect the marking at this position, so that any misalignment directly causes an error in the marking position.

In the marking operation, when the lens has a cylindrical refracting power, the direction of the cylinder axis is marked by means of three marking means arranged on a line. Since the groups of the marking stylus are not rotatable, it is necessary that the lens itself is rotated for the purpose of marking of the cylinder axis direction. The rotation of the lens also is one of the factors which cause the error.

Thus, the conventional marking operation often causes errors in the measurement of the refractive characteristics and in the marking position due to its complexed nature, and requires a long working time. Therefore, although the known automatic lensmeter permits an automatic high-speed measurement of the refractive characteristics, such automatic lensmeter cannot provide any substantial shortening of the whole measuring time including the alignment and marking over the conventional manual lensmeter.

SUMMARY OF THE INVENTION

Accordingly, an object of the invention is to provide a full-automatic lensmeter which can automatically perform the marking operation, thereby overcoming the problems of the prior art.

Another object of the invention is to provide an automatic alignment apparatus for a lensmeter which can automatically align the optical axis of the lens to be tested to the optical axis of the lensmeter.

To this end, according to the invention, there is provided an automatic marking device for a lensmeter comprising: a lens support member; lens holding means having a lens holding member which cooperates with the lens supporting member for clamping there between the lens movably in a plane substantially perpendicular to the measuring optical axis of the lensmeter; a marking section having a marking unit movably mounted on the lens holding means and having at least one marking stylus, the marking unit being carried for rotation about an axis which is parallel to the measuring optical axis; at least two hands having inner surfaces for contacting the adjacent edges of the lens such as to clamp the lens there between; and a hand moving means for moving the hands in the plane in accordance with the result of measurement of the refraction characteristics of the lens.

According to another embodiment of this invention, there is provided an automatic alignment apparatus for a lensmeter comprising: a lens support member; lens holding means having a lens holding member which cooperate with the lens supporting member for clamping therebetween the lens movably in a plane substantially perpendicular to the measuring optical axis of the lensmeter; at least two hands having inner surfaces for contacting the edge of the lens such as to clamp the lens therebetween; and hand moving means for moving the hands in the plane in accordance with the result of measurement of the refraction characteristics of the lens.

According to this arrangement, the lens is held by the lens holding means and the hands, and the lens holding means and the hands are moved in the direction orthogonal to the direction of the measuring axis such as to bring the lens to a position where the optical center of the lens is aligned with the measuring axis, thereby allowing an automatic marking. For the purpose of marking of astigmatism axis, the marking units are rotated about the measuring axis such as to bring the position of the marking stylus into alignment with the direction of the astigmatic axis.

The device of the invention allows a fully automatic marking and/or alignment operation and ensures higher efficiency and precision of the work.

DETAILED DESCRIPTION OF THE PREFERRED EMBODIMENTS

Principle of the Invention

Figure 1A:
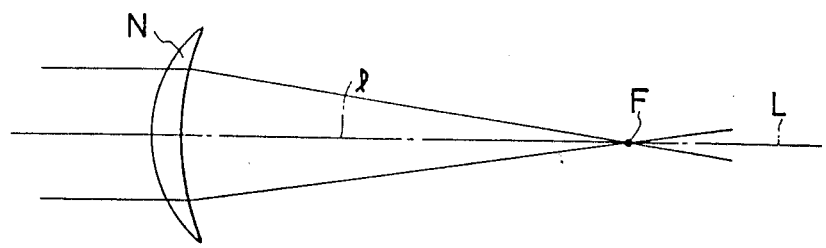
FIGS. 1a and 1b are schematic illustrations showing the relationship between a lens to be examined and the measuring optical axis of a lensmeter.
Figure 1B:
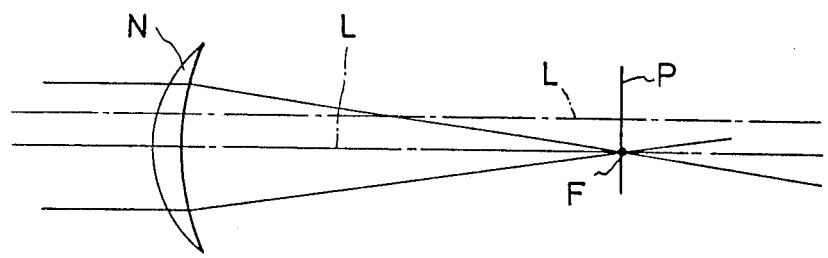
Figures 2, 3:
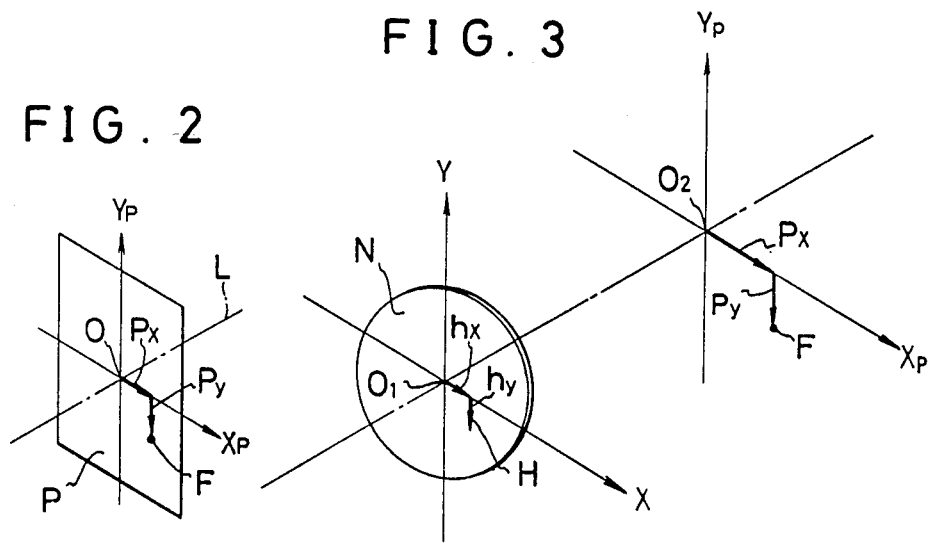
FIGS. 2 to 4 are schematic illustrations showing the relationship between the prism refraction power and offset amount.
Figure 4:
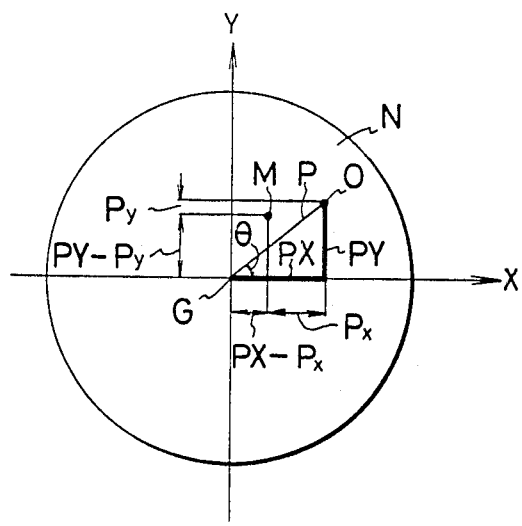

An explanation will be made first as to the principle of operation of the device in accordance with the invention. When the optical axis of the lensmeter is aligned with the optical axis of the measuring optical system, the focus of the lens is positioned at a point F on the optical axis L as shown in FIG. 1a. However, when the optical axis of the lens is offset from the optical axis L of the lensmeter, i.e., in the event of misalignment of the optical center of the lens N, the focus F of the lens N is positioned out of the optical axis L, on a plane P which is perpendicular to the optical axis of the lensmeter and spaced by a distance equal to the focal distance of the lens N, as shown in FIG. 1b. As shown in FIG. 2, the amount of offset of the focus F from the optical axis L of the lensmeter can be expressed as $P_x$, $P_y$ on an imaginary orthogonal coordinate assumed on the above-mentioned plane P and having an origin O located at a point where the optical axis L passes through the plane P. The amounts $P_x$ and $P_y$ are usually treated as being prism amounts. When the lens is measured by a lensmeter using the origin O on the plane P as the measuring point, the amounts of prism refraction are measured as $P_x$ (in case of lens for right eye, the prism refraction amount is $P_x$ in terms of base-in) and $-P_y$ (prism refraction amount is $P_y$ in terms of base-down). In this case, the optical center of the lens is positioned at the point $(P_x, P_y)$. The prism refraction power is expressed in terms of prism diopter. Assuming here that a light beam is passed through an optical system in parallel with the optical axis of the system, the refraction power of the optical system is 1 (one) prism diopter when the light beam after passing through the optical system is 1 cm offset from the optical system at a position 1 m apart from the optical system. That is, the prism refraction power is the amount of deflection of light caused by the optical system.

In attaining an alignment or in determining the optical center of the lens by means of a lensmeter, it is necessary to detect the geometrical offset of the optical center from the measuring point of the lens. As will be seen from FIG. 3, the condition expressed by the following formula applies to the case where the lens has only a spherical refraction power.

$$P_x = D \cdot h_x, \quad P_y = D \cdot h_y \qquad (1)$$

where, D represents the refraction power of the lens N, $P_x$ represents the prism refraction power in the x-direction, $P_y$ represents the prism refraction power in the y-direction, and $h_x$ and $h_y$ represent, respectively, the geometrical offset of the optical axis H of the lens from the measuring point $O_1$.

From formula (1) above, the geometrical offset $h_x$ and $h_y$ are determined as follows.

$$h_x = \frac{P_x}{D}, \quad h_y = \frac{P_y}{D} \qquad (2)$$

Therefore, it is possible to attain alignment between the optical axis L of the lensmeter and the optical axis of the lens and, hence, to effect an accurate marking, by measuring the spherical refraction power and prism refraction power at a suitable point on the lens, computing, from these meaured values, the amounts $h_x$ and $h_y$ of offset of the measuring point from the optical axis, and moving the lens in respective directions by amounts corresponding to the computed amounts $h_x$ and $h_y$ of offset.

Referring now to the case where the marking is to be done on the geometrical center of the prism-finished lens, it is considered that the geometrical center G has prism amounts $P_X$ and $P_Y$ as measured from the optical axis O. When this lens N is measured at a desired measuring point M, when the prism measuring amounts are $P_x$ and $P_y$, the geometrical center G at which the alignment or the marking is to be done is computed as follows, using the formula (2) shown above.

$$h_x = \frac{P_X - P_x}{D}, \quad h_y = \frac{P_Y - P_y}{D} \qquad (3)$$

In the case where the prism amount P and the base direction are given not in terms of the orthogonal coordinate (usually, base directions are expressed by base-in, base-out, base-up and base-down) but by a polar coordinate system in which the prism amount P and the base direction are given by angle $\theta$, the above-explained method should be used after an orthogonal-polar coordinate conversion which is given by the following formula.

$$P_x = P \cos \theta, \ P_y = P \sin \theta \tag{4}$$

In the case where the treatment is conducted by making use of the prism function of the lens through offsetting the optical axis of the lens from the optical axis of the eye which is going to wear the spectacle, the above-explained principle directly applies by regarding the above-mentioned geometrical center G as the point where the optical axis of the eye passes through the plane (this point will be referred to as "point of action", hereinunder).

In the foregoing explanation, the refraction power of the lens is approximated by D on an assumption that the lens has only a spherical refraction power or that the cylindrical refraction power is extremely small as compared with the spherical refraction power. In order to attain higher precision of the alignment or the marking, the relationship between the measuring point and the optical axis is computed from the factors measured by the lensmeter such as the spherical refraction power, cylindrical refraction power and the cylindrical axis angle, as well as from the pure measured prism values which are independent of these factors, in accordance with the following method.

Figure 5:
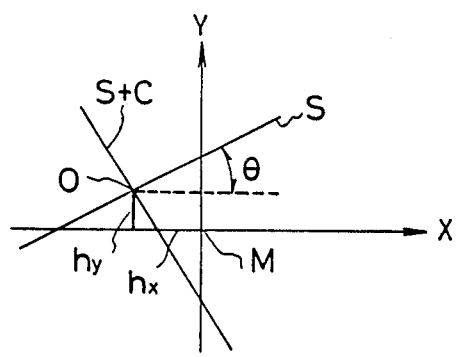
FIG. 5 is a schematic illustration showing the relationship among the principal meridians, the refraction power, and offset amount.

The refraction characteristics of the lens as measured by the automatic lensmeter are expressed as follows:
spherical refraction power: S
cylindrical refraction power: C
angle of cylindrical axis: $\theta$
horizontal prism amount: $P_x$
vertical prism amount: $P_y$ Using these factors, the optical axis of the lens is expressed by the following formula, as will be seen from FIG. 5.

$$h_x = \frac{P_x \cdot S + P_x \cdot C \cdot \cos^2 \theta + P_y \cdot C \cdot \sin \theta \cdot \cos \theta}{S \cdot (S + C)} \tag{5}$$

$$h_y = \frac{P_y \cdot S + P_y \cdot C \cdot \sin^2 \theta + P_x \cdot C \cdot \sin \theta \cdot \cos \theta}{S \cdot (S + C)}$$

In the case where the lens is a prism-finished lens or the case where the prism treatment is required, the amounts $h_x$ and $h_y$ of movement of the lens for attaining the alignment of the point of action or for marking are computed as follows, in order to obtain the desired prism amounts $P_X$ and $P_Y$.

$$h_x = \frac{(P_X - P_x) \cdot S + (P_X - P_x) \cdot C \cdot \cos^2 \theta + (P_Y - P_y) \cdot C \cdot \sin \theta \cdot \cos \theta}{S \cdot (S + C)} \tag{6}$$

$$h_y = \frac{(P_Y - P_y) \cdot S + (P_Y - P_y) \cdot C \cdot \sin^2 \theta + (P_X - P_x) \cdot C \cdot \sin \theta \cdot \cos \theta}{S \cdot (S + C)}$$

In the described principle of operation for alignment or marking, the amounts $h_x$ and $h_y$ of movement are determined by computation from the measured value of the prism refraction power of the lens. Insteadly of the determination by computation, the amounts $h_x$ and $h_y$ of movements may be determined by a feed-back method. Namely, for attaining the alignment of the optical center of the lens with the optical axis of the lensmeter, the prism amounts $P_x$, $P_y$ are momentarily measured by the measuring system of the lensmeter and the lens is moved in accordance with the result of the measurement such as to meet the conditions of $P_x = 0$ and $P_y = 0$. In the case where the lens is a prism-finished lens or where the prism treatment is required, the lens is moved such that the measured prism values $P_x$, $P_y$ coincide with the desired prism values $P_X$, $P_Y$, i.e., such as to meet the conditions of $P_x = P_X$ and $P_y = P_Y$.

Outline of Construction of Lens Meter

Figure 6:
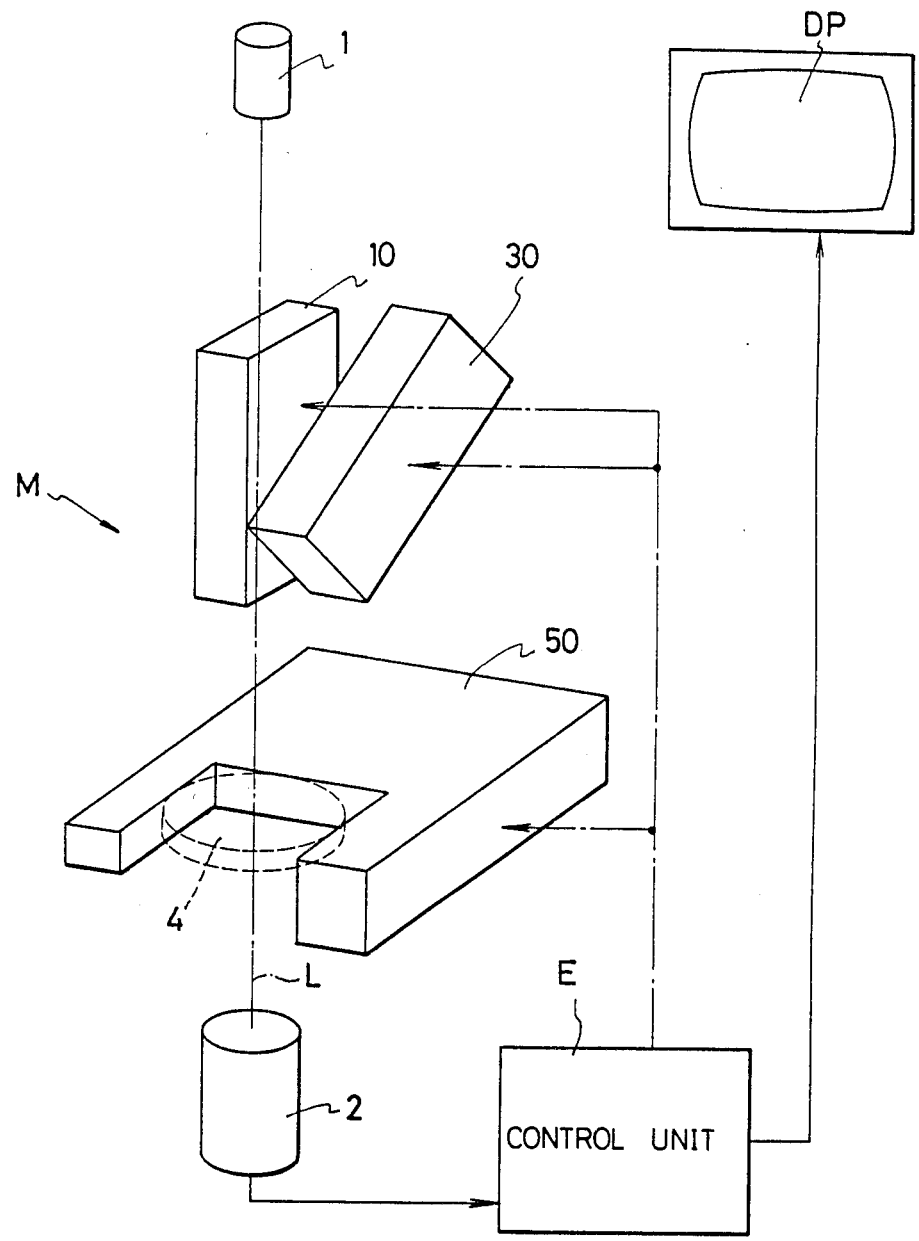
FIG. 6 is a schematic illustration showing the construction of a lensmeter to which the invention is applied.

FIG. 6 schematically shows the construction of a lensmeter to which the invention pertains. The lensmeter has a light-emitting section 1, optical detection system 2, marking section M, computing control section E which performs both the computation of the refraction characteristics of the lens on the basis of the measured data and the control of the marking section M, and a display device DP which displays the refraction characteristics determined by the computing controlling section E and the state of alignment. As to the detail of the method of measuring the refraction characteristics of the lens by the lensmeter, a reference shall be made, if necessary, to the specification of Japanese patent application No. 85490/1981. The marking section M is constituted by a lens holding section 10, a marking mechanism 30 and an alignment section 50. The lens is held by the alignment section 50.

Alignment Section

Figure 7A:
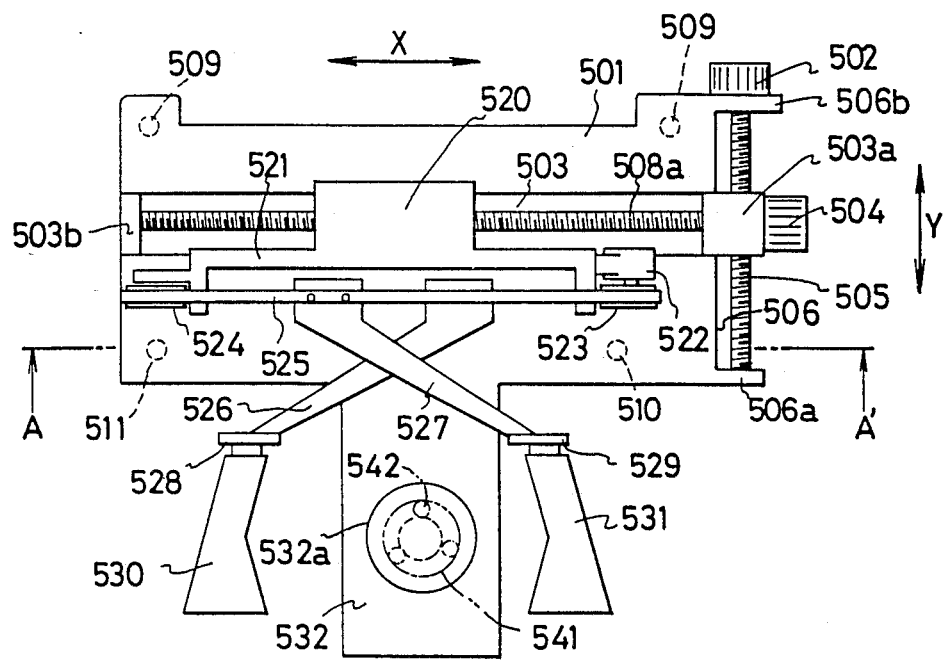
FIG. 7A is a plan view of an example of an alignment device.
Figure 7B:
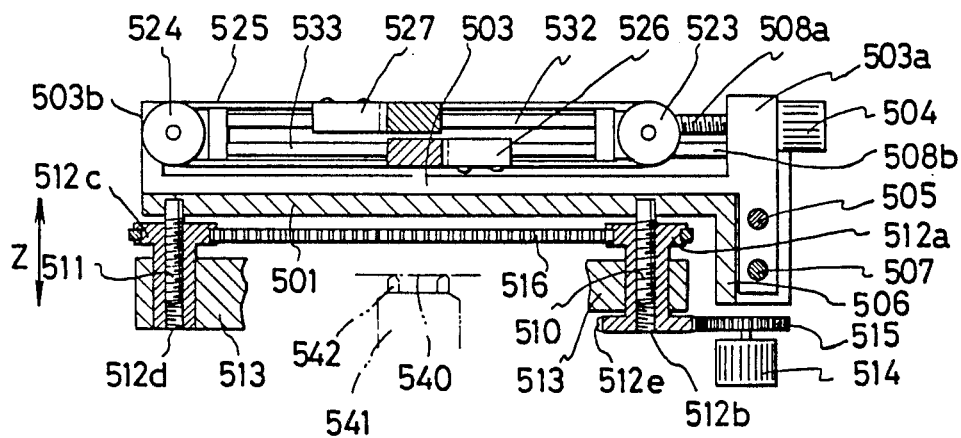
FIG. 7B is a sectional view take along the line A-A' of FIG. 7A.

The construction of the alignment section 50 will be explained hereinunder with specific reference to FIGS. 7 and 8. A Z-axis table 501 is provided on the reverse side thereof with a pair of slide pins 509 and a pair of feed screws 510, 511. The slide pins 509 are received in guide holes (not shown) formed in the base 513 of a housing (not shown) of the lensmeter body in such a manner as to be able to slide vertically along the guide holes, as shown in FIG. 7B. On the other hand, the feed screws 510, 511 are rotatable on the Z-axis table 501. The feed screw 510 meshes with a female screw thread 512b on the pulley 512a rotatably supported by the base 513. Similarly, the feed screw 511 meshes with a female screw thread 512d on a pulley 512c. A timing belt is stretched between the pulleys 512a and 512c. A gear 512e formed on the lower portion of the pulley 512a meshes with a drive gear 515 which is secured to a Z-axis feed motor 514. As the motor 514 rotates, the pulleys 512a and 512c are rotated simultaneously so that the feed screws 510, 511 and, hence, the Z-axis table 501 are moved up and down. A lens table 532 for mounting the lens to be examined is extended from the front side (lower side as viewed in FIG. 7) of the Z-axis table 501. An aperture 532a formed in the lens table 532 permits a lens support member 541 of the detection optical system to pass therethrough.

A Y-axis base 506 is formed on one side of the Z-axis table 501. Flanges 506a and 506b are formed to extend outwardly from both ends of the base 506. A Y-axis feed screw 505 and a Y-axis guide rail 507 are held between these flanges 506a and 506b. The Y-axis feed screw 505 is adapted to be driven rotationally by a Y-axis feed motor 502 secured to the flange 506b. The feed screw 505 engages with a female screw thread in a flange portion 503a on one end of the X-axis base 503 mounted on the Z-axis table. The Y-axis guide rail 507 extends through the flange portion 503a such as to guide the movement of the X-axis base 503 when the feed screw 505 is rotated by the operation of the motor 502.

The X-axis base 503 is provided on its side opposite to the flange 503a with another flange 503b. An X-axis feed screw 508a and an X-axis guide rail 508b are extended over these flanges 503a and 503b. The feed screw 508a is adapted to be driven rotationally by means of an X-axis feed motor 504 secured to the flange 503a, as will be seen from FIG. 7B. The feed screw 508a meshes with the female screw thread on the arm base 520 as shown in FIG. 7A, while the feed guide rail 508b extends through the arm base 520 such as to guide the movement of the arm base 520 caused by the rotation of the feed screw 508a as a result of operation of the motor 504.

The arm base 520 is provided with a flange 521 which project both to the left and right from the arm base 520. The flange 521 carries at its left side a pulley 524 rotatably and at its right side with an arm driving motor 522 having a pulley 523. A timing belt 525 is stretched between both pulleys in an endless manner. A pair of hand arms 526 and 527 are attached to the belt 525 such as to move in opposite directions. The hand arms 526 and 527 are adapted to slide along arm guide rails 532, 533 provided on the flange 521. The hand arms 526 and 527 are stretched such as to intersect each other at their intermediate portions. Spectacle frame abutment surfaces 528, 529 are constituted by vertical end surfaces of these hand arms 526, 527. Hands 530, 531 are extended forwardly from the lower end portions of respective abutment surfaces 528, 529.

Figure 8A:
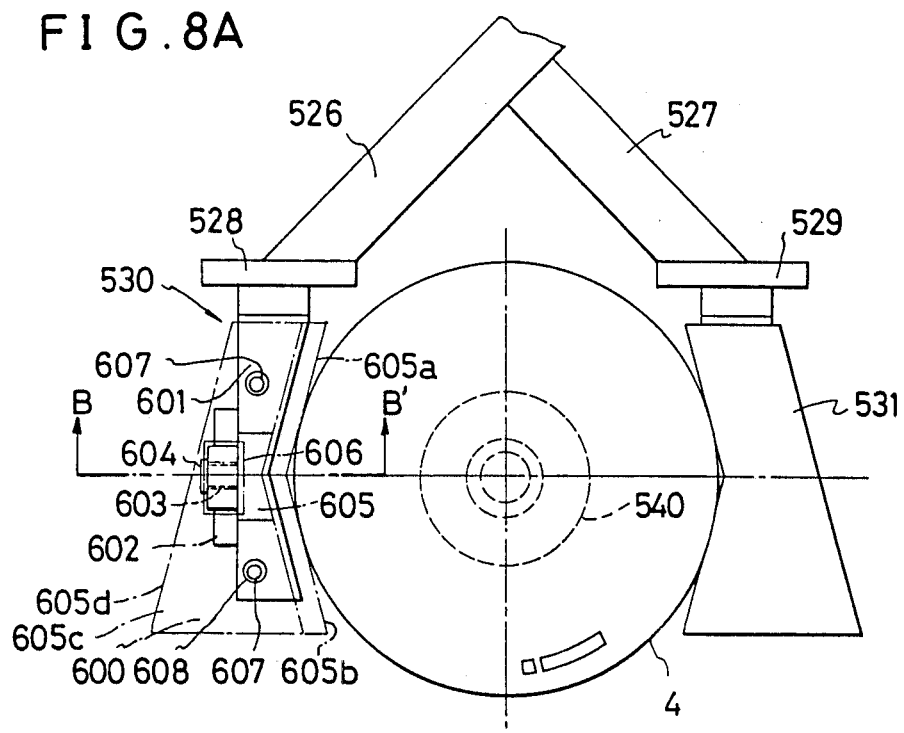
FIG. 8A is a plan view showing the construction of a hand section.
Figure 8B:
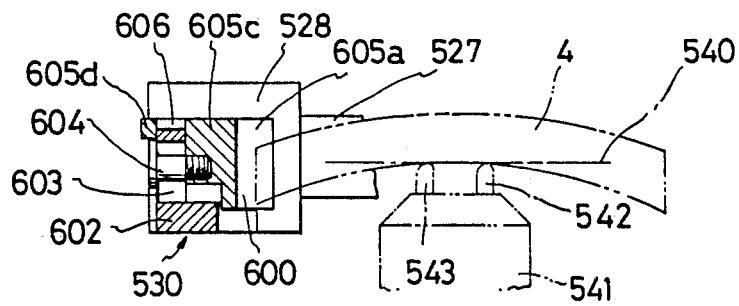
FIG. 8B is a sectional view taken along the line B-B' of FIG. 8A.
Figure 8C:
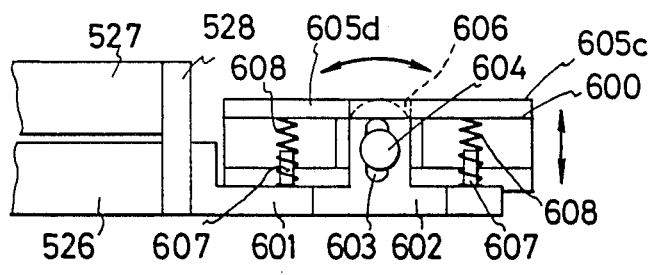
FIG. 8C is a left side view of the hand section.

FIGS. 8A to 8C show the constructions of the hands 530, 531. Since the hand 530 and the hand 531 are constructed and arranged in mirror-symmetry, the description will be focussed mainly on the hand 530. The spectacle frame abutment surface has a hand piece supporting base 601 which projects forwardly from the lower end thereof. The supporting base 601 has a supporting pillar 602 which is provided at its intermediate portion with upwardly extending leg. A vertical slot 603 is formed in the leg of the supporting pillar 602. A flat-head screw 604 is slidably received in the slot 603. The flat-head screw 604 is fixed to the hand piece 600 so that the supporting pillar 602 supports the hand piece 600 for rotation and vertical movement within the slot 603. An aperture 606 formed in the upper portion 605c of the hand piece 600 provides a space which permits the head of the supporting pillar 602 to escape during rotation and vertical movement of the hand piece. The side surface of the hand piece is constituted by a first abutment surface 605a and a second abutment surface 605b both of which are vertical surfaces and are arranged to cross-each other in a V-like form. The outer surface 605d of the upper portion 605c of the hand piece is tapered such as to diverge towards the front side. Springs 608 and 608 are fitted on pins 607, 607 provided on the upper surface of the supporting base 601. The upper ends of the springs 608, 608 abut the underside of the hand piece 600.

The mechanical operation of the alignment section 50 having the described construction will be explained hereinunder.

The description will be commenced with the alignment for the unedged lens. After a lens 4 is placed on the lens table 532, the arm driving motor 522 is started so that the belt 525 is driven, thereby rotating the pulley 523 counterclockwise as viewed in FIG. 7B. Since the hand arms 526 and 527 cross each other, the hands 530 and 531 are moved such as to reduce the distance therebetween, thus clamping and holding the lens at opposing edges of the lens. The amount of movement of the hands required for clamping the lens is reduced by virtue of the crossing arrangement of the arms 526 and 527. Subsequently, a lens pressing ring of a lens pressing section 10 is lowered to press the lens surface. As the motor 514 is started in this state, pulleys 512a and 512c are rotated to lower the Z-axis table 501. The lens is lowered while being clamped by the hands 530 and 531, until the reverse side of the lens comes into contact with three lens holding pins 540 on the lens support member 541. The lens holding pins 542 in combination form a measurement reference plane 540. The lens table 532 is further lowered so that the lens is held on the lens holding pins 542. In this state, the lens is held by hands 530, 531, lens holding pins 542 and the lens pressing ring. As the X-axis base 503 is moved in the Y-axis direction as a result of rotation of the Y-axis feed screw driven by the Y-axis driving motor 502, the lens is moved in the Y-axis direction. Similarly, the lens is moved in the X-axis direction as the arm base 520 is moved in the X-axis direction as a result of the rotation of the X-axis feed screw 508a caused by the X-axis driving motor 504. The lens is supported mainly by the lens holding pins 542 and the lens pressing ring, while the moving force for moving the lens in the X- and Y-axis directions for alignment is imparted by the hands 530 and 531.

Figure 11:
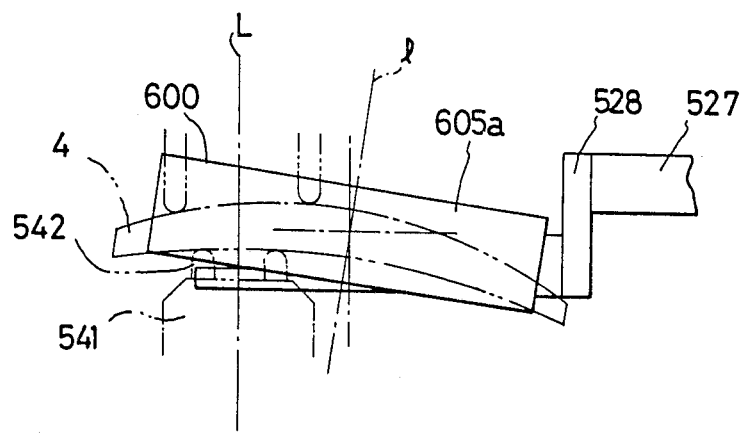
FIG. 11 is an illustration of operation of the first embodiment of the hand section.

The hand pieces 600 and 601 which clamp the lens on the lens holding pins 542 during the movement in the X- and Y-axis directions are subjected to vertical and rotational forces. These forces, however, are relieved because the flathead screw 604 can rotatingly and slidably move within the slot 603 such as to permit the hand pieces to freely rotate and move up and down as shown in FIG. 11.

Figure 12:
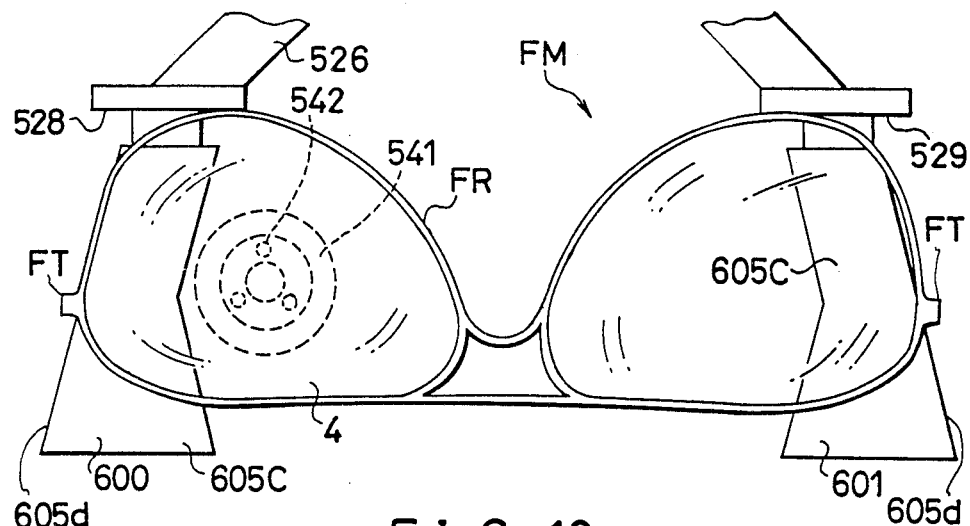
FIG. 12 is an illustration of the positional relationship between the hand section and a spectacle frame mounted thereon.

FIG. 12 illustrates a manner in which a lens fitted in a spectacle frame is held by the alignment section. The spectacle frame FM is placed on the upper side 605c of the hand pieces 600 and 601. The temple portions FT of the spectacle frame FM are contacted at their inner surfaces by the outer surfaces 605d of the hand pieces 600, 601, while the lower edges of the lens frame FR are held in abutment with abutment surfaces 528 and 529. Thus, the spectacle frame is located with respect to the hands by means of the outer surfaces 605d of the hand pieces and the abutment surfaces 528, 529. Since the outer surfaces 605d are tapered as explained before, the spectacle frame can be held stably irrespective of the size of the frame FR and the position of the temple portions FT. In addition, since the outer surfaces 605d are converged towards the frame abutment surfaces 528, 529, these outer surfaces serve to keep the frame FR always in abutment with the abutment surfaces 528, 529. The lens 4 fitted in the spectacle frame is held in the same way as the unedged lens by the lens support member 541 and moved in the X- and Y-axis directions for alignment in the same way as the unedged lens.

Figure 9:
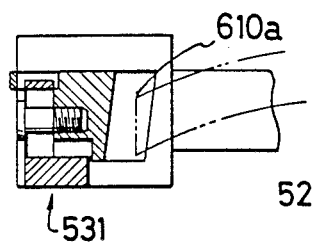
FIG. 9 is a vertical sectional view showing another embodiment of the hand section.
Figure 13:
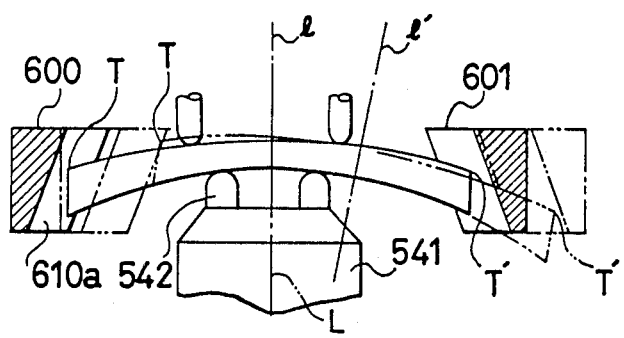
FIG. 13 is an illustration of the operation of the embodiment of the hand section shown in FIG. 9.

FIG. 9 shows a modification of the lens abutment surfaces of the hand pieces. In this case, the lens abutment surfaces 610a are diverged downwardly, so that the lens abutment surfaces 610a make point contact as at T and T' with the edges of the lens 4, as shown in FIG. 13. This arrangement permits an easy relief of the lens such as to prevent the lens from any extraordinary force.

Figure 10A:
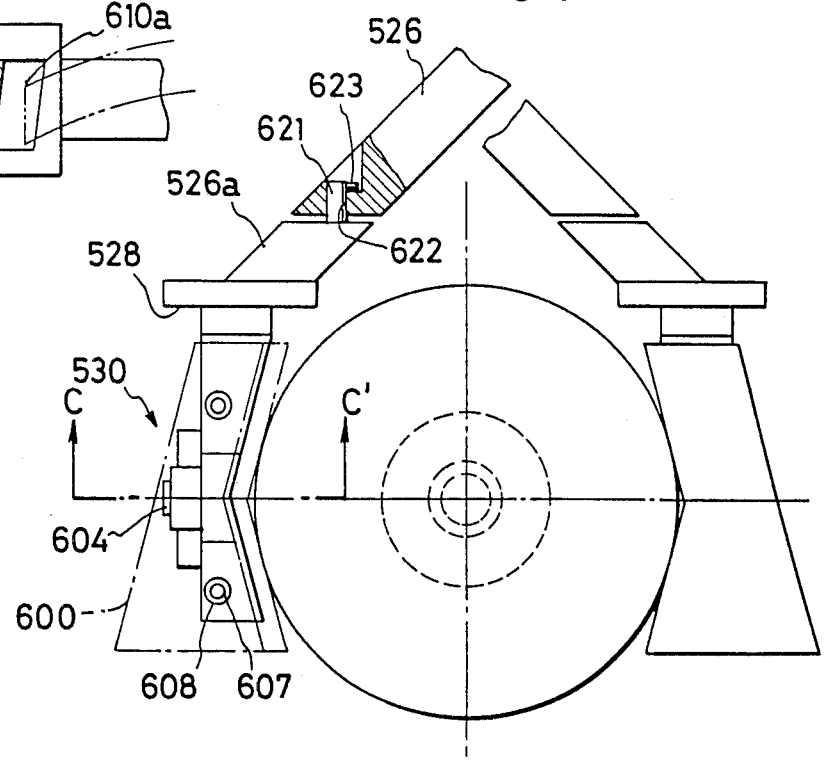
FIG. 10A is a plan view of still another embodiment of the hand section.
Figure 10B:
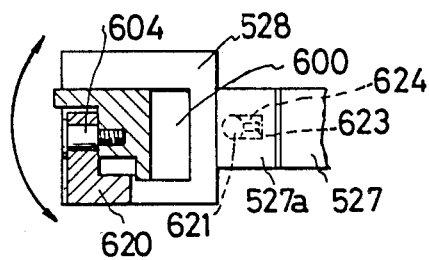
FIG. 10B is a sectional view taken along the line C—C' of FIG. 10A.
Figure 10C:
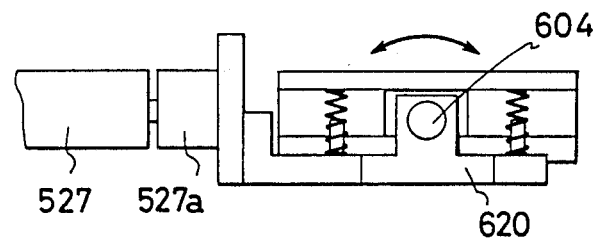
FIG. 10C is a left side view of the embodiment of the hand section as shown in FIG. 10A.

FIGS. 10A to 10C show still another embodiment of the hands. In this embodiment, the arms 526, 527 are partly rotatable such as to absorb any torque and vertical force which is applied to the hand pieces during offsetting of the lens. The arms 526 and 527 are constructed and arranged in mirror-surface symmetry with each other so that only the arm 526 will be described. The arm 526 includes a rotary arm 526a. The arm 526 and the rotary arm 526a are connected to each other through a shaft member 621 provided on the rotary arm 526a and a bearing 622 formed on the arm 526 and rotatably receiving the shaft member 621. A limit pin 623 is provided on the end of the shaft member 621. The pin 623 is positioned within a notch 624 formed in the arm 526 and is adapted to contact the side surfaces of the notch 624 thereby limiting the angle of rotation of the rotary arm 526a to a predetermined range. The other end of the rotary arm 526a has the frame abutment surface 528 and the hand 530 as in the case of the preceding embodiment. In this embodiment, the provision of the slot 603 is not always necessary and an ordinary rotary bearing type structure can be adopted instead, because the vertical force applied to the hand piece 600 can be absorbed by the rotation of the rotary arm 526a.

In the described embodiments of the alignment section, the hands are intended for the clamping of the lens or the holding of the spectacle frame and the aligning movement of the lens is effected by the movement of the arm base within the X-Y plane. This, however, is not exclusive and the arrangement may be such that the hands themselves move in the X- and Y-axis directions independently of each other.

Lens Pressing and Marking Sections

Figure 14A:
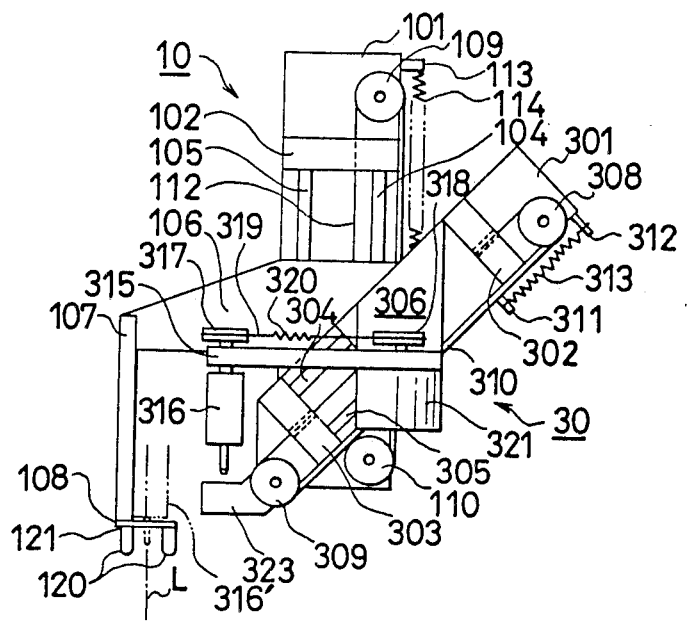
FIG. 14A is a right side view showing the construction of a lens pressing section and a marking section.
Figure 14B:
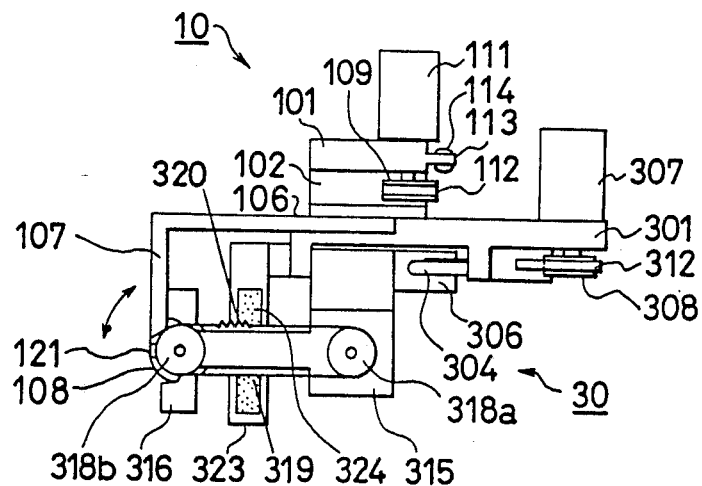
FIG. 14B is a plan view of the lens pressing section and the marking section.
Figure 14C:
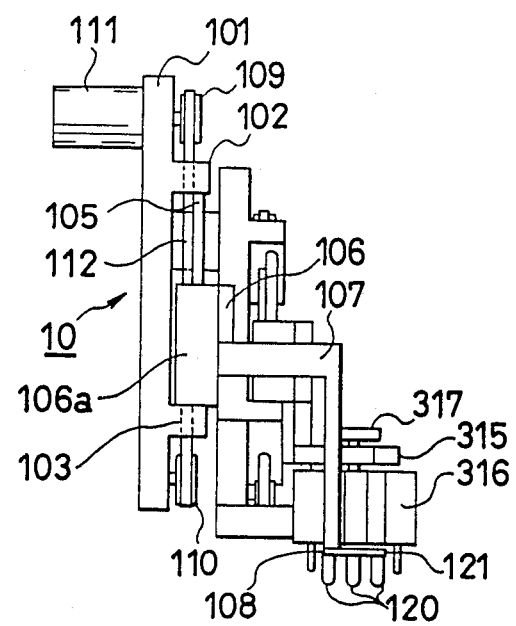
FIG. 14C is a front elevational view of the lens pressing section and the marking section.

FIGS. 14A to 14C show embodiments of the lens pressing section 10 and the marking section 30. The lens pressing section 10 has a vertically movable base 101 on which are formed spaced flanges 102 and 103. A pair of guide rails 104 and 105 are extended over these flanges 102 and 103 in parallel with each other. These rails 104 and 105 are inserted in the bearing portion 106a on a lens pressing table 106. The bearing portion 106a has a linear bearing-type construction and is arranged such as to permit the table 106 to move vertically along the rails 104, 105. An L-shaped lens pressing post 107 is formed on the end of the lens pressing table 106. A later-mentioned lens pressing ring 108 is attached to the end of the lens pressing post 107. A driving pulley 109 and a pulley 110 are rotatably mounted on the vertically movable base 101. The driving pulley 109 is adapted to be driven by a vertical driving motor 111 secured to the base 101. A steel belt 112 is stretched between these pulleys 109 and 110 with its both ends fixed to the upper and lower surfaces of the lens pressing table 106. The arrangement is such that, as the driving pulley 109 is rotated by the motor 111, the table 106 is moved up and down. In order to smooth the vertical movement of the table and also to reduce the driving force required for the vertical movement of the table, a coiled tension spring 114 is stretched between a pin 113 provided on a side surface of the base 101 and another pin (not shown) provided on a side surface of the table 106, such as to produce a force which balances the weight of the table 106 and other members.

The marking section 30 is obliquely secured to the lens pressing table 106. A pair of parallel guide rails 304 and 305 are extended between flanges 302 and 303 of the base 301 of the marking section 30. A marking table 306 is slidable on these rails. The bearing portion of the marking table 306 has a linear bearing type structure as in the case of the lens pressing table 106, such as to ensure smooth sliding of the marking table 306 along the guide rails 304, 305. The base 301 has a driving pulley 308 which is driven by a motor 307 for driving a marking table 306 and a pulley 307. A steel belt 310 is stretched between these pulleys and is connected at its both ends to a side surface of a table 306. With this arrangement, it is possible to move the table 306 along the rails 304 and 305 by the power of the motor 307. A coiled tension spring 313 is stretched beween a pin 311 provided on the underside of the table 306 and a pin 312 on the underside of the base 301 such as to produce a force which balances the weight of the table and associated members.

A marking stylus unit 316 is rotatably supported by a flange 315 on the table 306. A pulley 318b is attached to the end of the rotary shaft of the marking stylus unit 316. On the other hand, a marking unit driving motor 321 is secured to the underside of the flange 315. The motor 321 has a shaft to which is attached a driving pulley 318a. A miniature rope 319 is stretched between these pulleys 318a, 318b. Both ends of the miniature rope 319 are connected to springs 320 which impart a suitable tension to the rope 319.

An ink pot 323 is secured to the lower end of the base 301 at such a position that the stylus of the marking unit 316 faces the ink pot 323 when the marking table 306 is in the initial position. The ink pot 323 has an ink storage member 324 such as felt.

Figure 15:
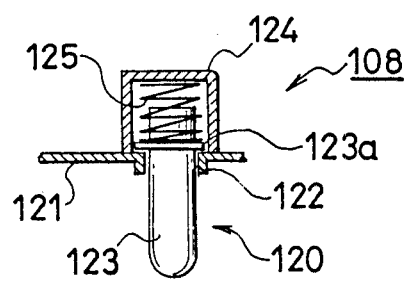
FIG. 15 is a vertical sectional view showing the construction of lens pressing pins.

The lens pressing ring 108 has a horse-shoe-shaped pressing pin holding plate 121 which carries three lens pressing pins 120, one on the center and two on both ends thereof. As will be seen from FIG. 15, each lens pressing pin 120 is composed of a lens pressing pin 123 having a collar 123a received in a hole 122 formed in the holding plate 121, cylinder 124 and a pressing spring 125 acting between the collar 123a and the bottom surface of the cylinder. The spring 125 normally biases the pin 123 downwardly. With this arrangement, when the lens pressing ring 108 cooperates with the lens holding pins 542 of the alignment section 50 in clamping therebetween the lens 4, the lens pressing pins 123 can press the lens surface regardless of the curvature of the lens surface.

Figure 16A:
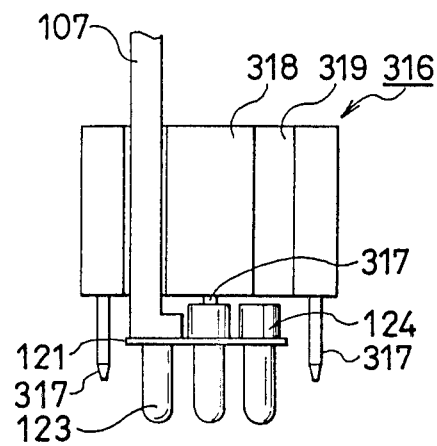
FIG. 16A is a front elevational view showing the relationship between a marking unit and a lens pressing ring.
Figure 16B:
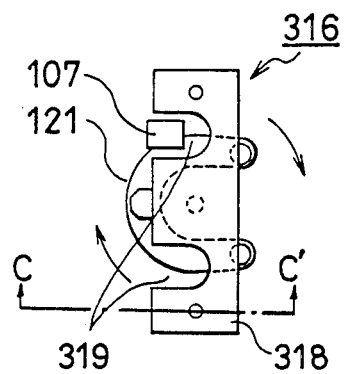
FIG. 16B is a plan view of the construction shown in FIG. 16A.
Figure 16C:
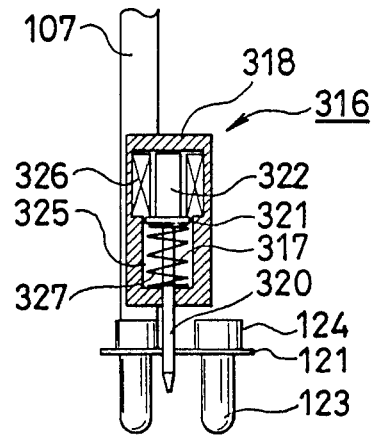
FIG. 16C is a vertical sectional view showing the construction of marking styli.

FIGS. 16A to 16C show the construction of the marking unit 316. The marking unit 316 has three marking styli 317 arranged along a line and a stylus holding member 318 which holds these styli 317. The holding member 318 is provided with a notch 319 which prevents the unit 316 from being interfered by the post 107 when it is rotated. Each marking stylus 317 is composed of a stylus portion 320, collar portion 321 and a magnet portion 322, and is received in a cylinder 325 formed in the supporting member 318. An electromagnetic induction coil 326 is incorporated in the upper portion of the cylinder 325, the magnet portion 322 of the marking stylus is received in this coil 326. A pressing spring 327 acting between the collar portion 321 and the bottom of the cylinder portion always urges the marking stylus 317 upwardly.

The mechanical operation of the lens pressing section 10 and the marking section 30 having the described on structures will be explained hereinunder. In the initial state of operation, the lens pressing table 106 is held in contact with the flange 102 of the vertically movable base 101, while the marking table 306 abuts the flange 302 of the base 301. As a lens holding instruction is issued, the motor 111 is rotated counter-clockwise so that the lens pressing table 106 is lowered thereby lowering the marking section 30 and the lens pressing ring simultaneously. In consequence, the lens pressing pin 120 of the lens pressing ring 108 are brought into contact with the lens 4 thus clamping and holding the lens 4 in cooperation with the lens holding pins 542. After alignment of the lens optical axis with the optical axis L of the lensmeter and the measurement of the refraction characteristics, the marking is effected by a marking instruction issued so that the electromagnetic induction coil 326 is energized thereby lowering the marking styli 317 overcoming the force of the pressing spring 327 into the ink pot 323 thus attaching the ink in the pot to the end of the stylus positions 320. Then, the motor 307 is rotated counterclockwise thereby lowering the marking table 306 until it contacts the flange 303. As a result, the marking unit 316 is moved to a position 316' which is shown by imaginary line in FIG. 14A, where the central marking stylus 317 is aligned with the optical axis L of the lensmeter. Subsequently, the motor 321 is operated to rotate the marking unit to a desired angle, i.e., to the cylinder axis angle of the lens, and the coil 326 is energized to activate the stylus 320 thereby effecting a marking on the lens surface.

Figure 17A:
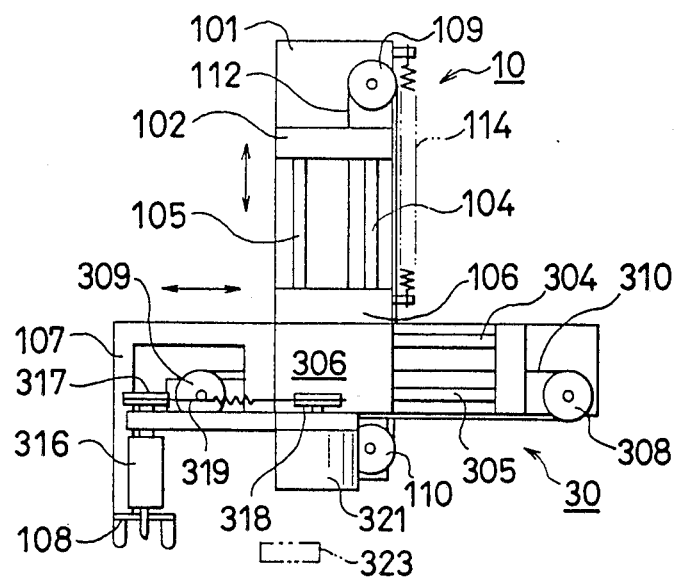
FIG. 17A is a right side view of another embodiment of the lens pressing section and the marking section.
Figure 17B:
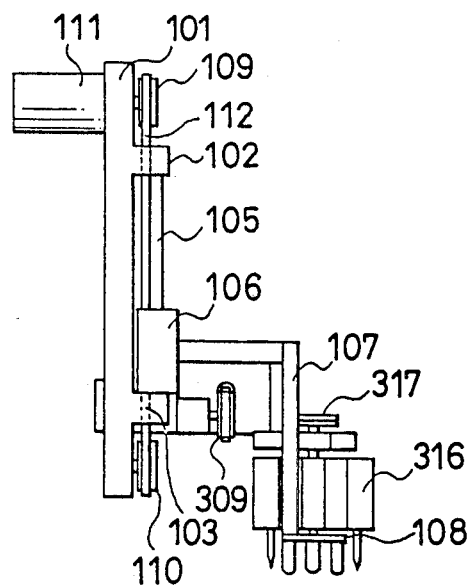
FIG. 17B is a front elevational view of the arrangement shown in FIG. 17A.

FIGS. 17A and 17B show first modifications of the lens pressing portion 10 and the marking portion 30. In this arrangement, the making section 30 is moved in the direction perpendicular to the direction of movement of the lens pressing portion 10. In these Figures, the same reference numerals are used to denote the same parts or members as those used in the preceding embodiments of the lens pressing section 10 and the marking section 30, and detailed description of such parts or members is omitted.

Figure 18A:
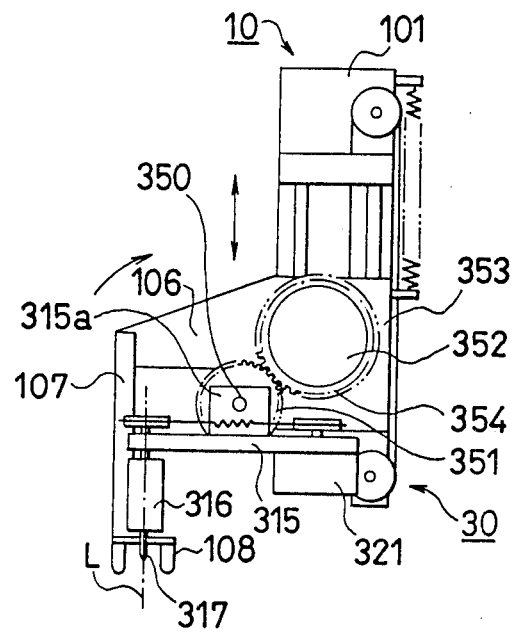
FIG. 18A is a right side view of still another embodiment of the lens pressing section and the marking section.
Figure 18B:
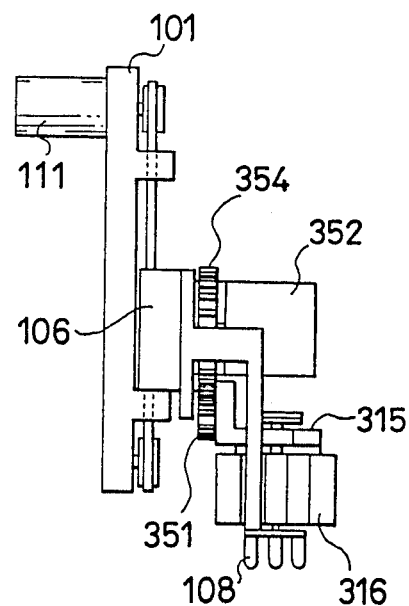
FIG. 18B is a front elevational view of the arrangement shown in FIG. 18A.

FIGS. 18A and 18B show another modifications in which the marking section 30 is adapted to be rotated with respect to the lens pressing section 10. In this case, a motor 352 for rotatingly driving the marking section is secured to the motor flange 353 of the lens pressing table 106. The motor 352 has a shaft to which is attached a gear 354. On the other hand, the bearing portion 315a of the flange 315 is rotatably supported by a shaft 350 provided on the table 106. A gear 351 fixed to the bearing portion 315a meshes with the gear 354. According to this arrangement, the marking unit 316 which is retracted in the initial state from the path of measuring light in the lensmeter is moved to a position where the marking stylus 317 is aligned with the measuring optical aixs L, by a counter-clockwise rotation of the flange 315 caused by a clockwise rotation of the motor 352.

Although in this embodiment the marking unit 316 has three styli and rotatable about the axis of the central stylus, this arrangement is not exclusive. For instance, the marking unit 316 may be arranged to have only two styli and to rotate about the axis of one of the styli. Alternatively, the marking unit can have only one stylus and may be arranged to move along a rail perpendicular to the axis of rotation.

Although in the described embodiments the ink is stored in an ink pot into which the stylus is projected, the arrangement may be such that the stylus itself may be of such a type as is capable of containing the ink, e.g., a felt pen type structure. With this arrangement, it is possible to eliminate the ink pot.

Computing Control Section and Operation Sequence

Figure 19:
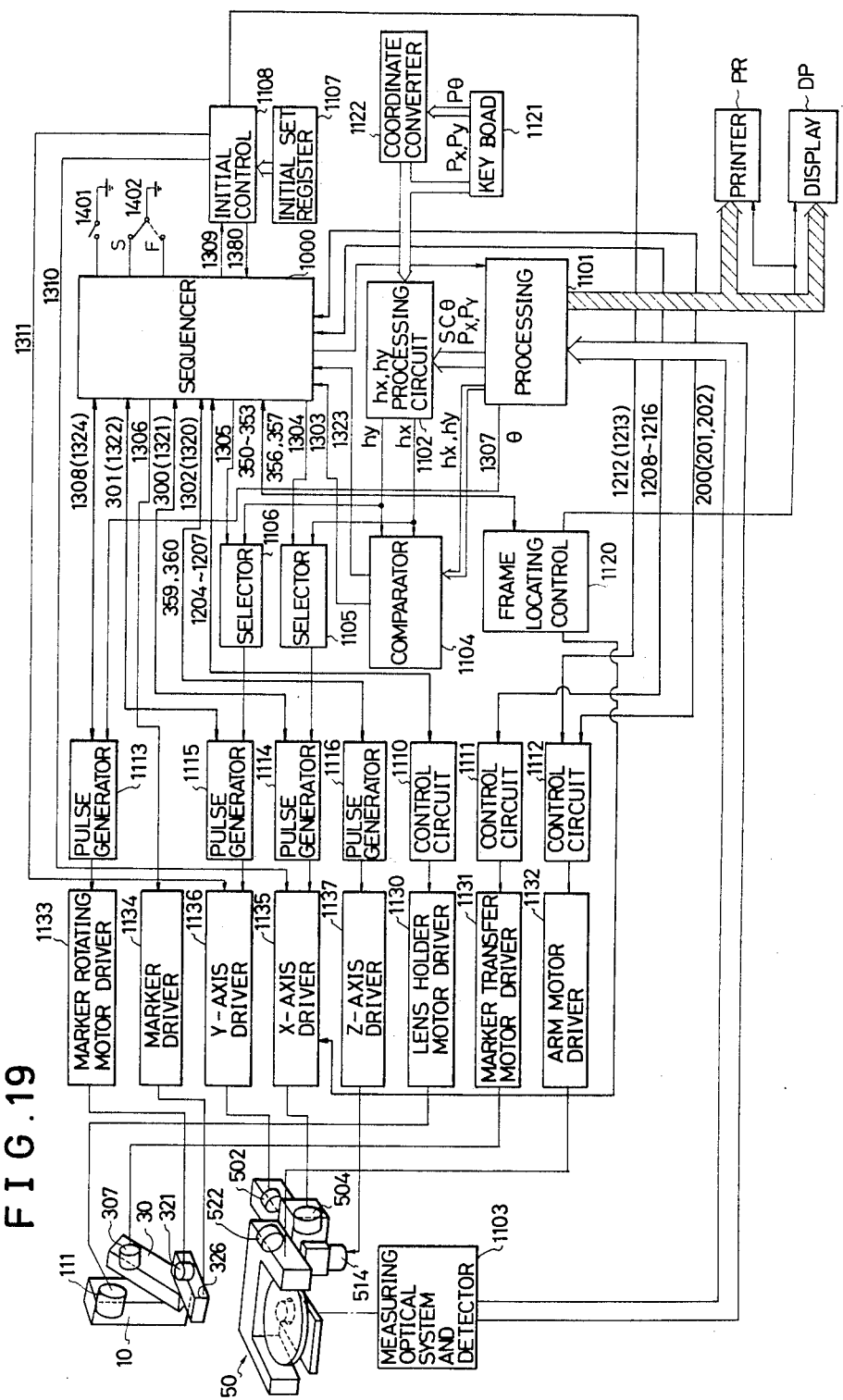
FIG. 19 is a block diagram showing the arrangement of a computing control section E.
Figure 20:
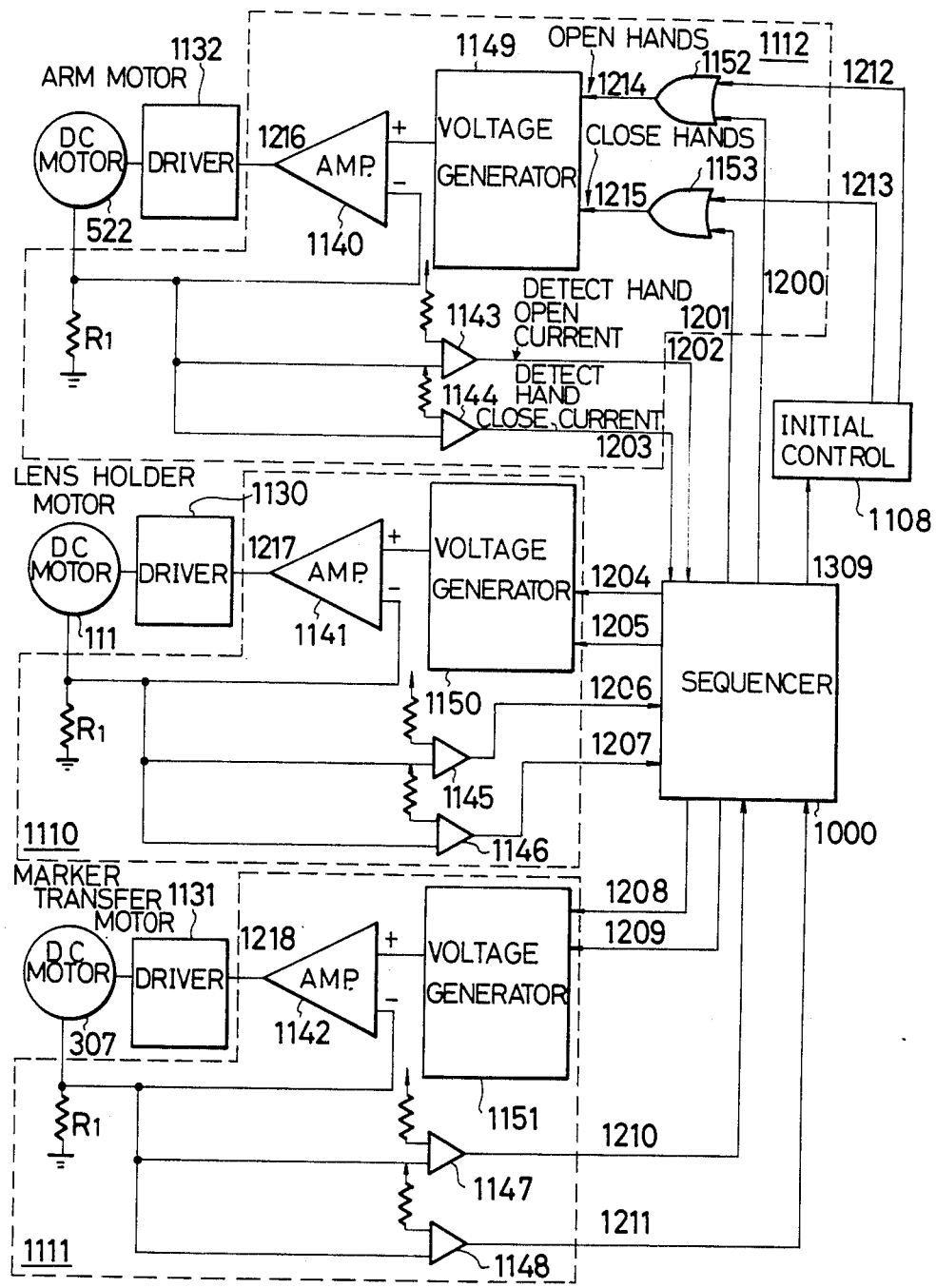
FIG. 20 is a block diagram showing the arrangement of control circuits 1110 to 1112.
Figure 21:
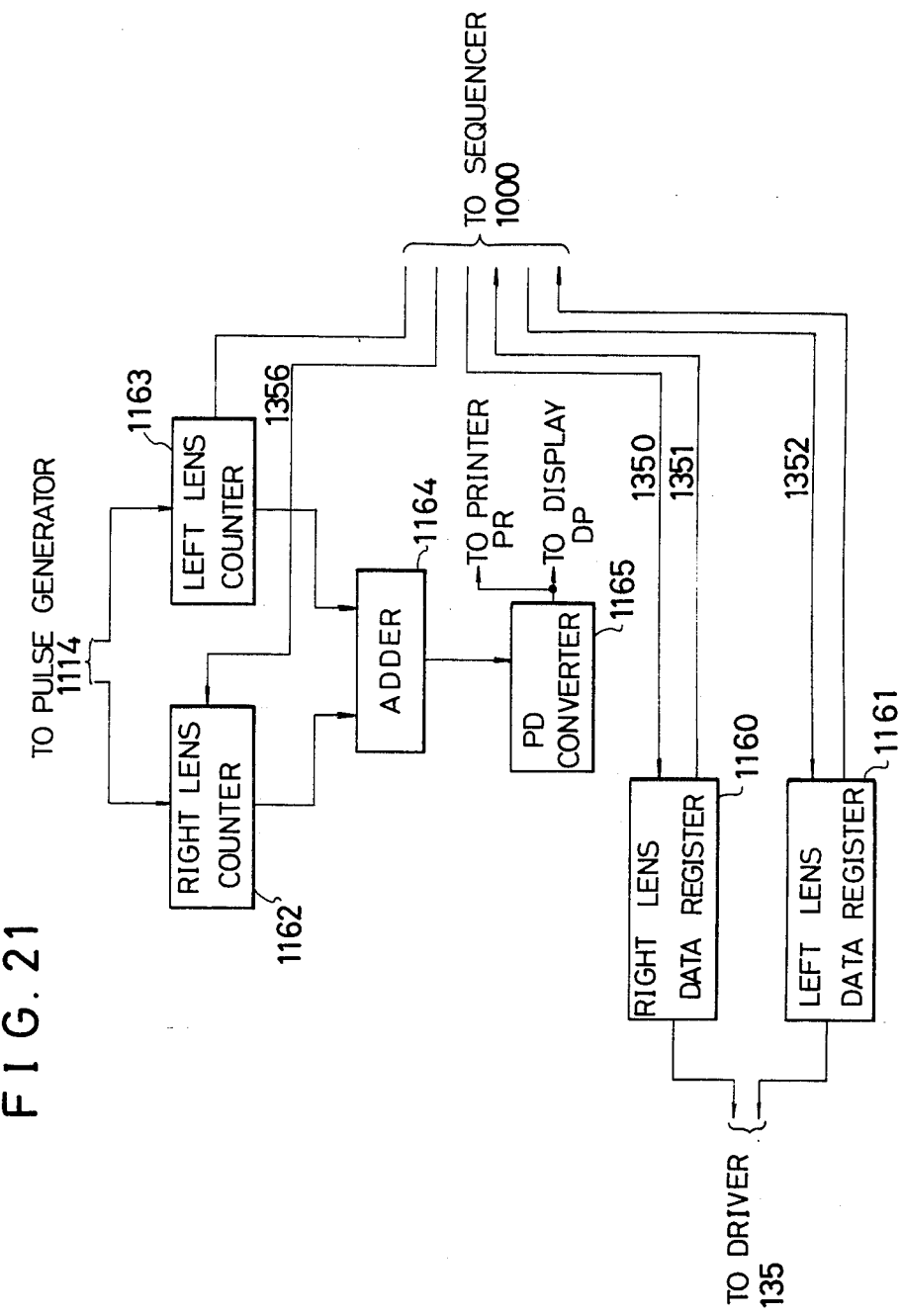
FIG. 21 is a block diagram showing the arrangement of a frame locating controller.
Figure 22:
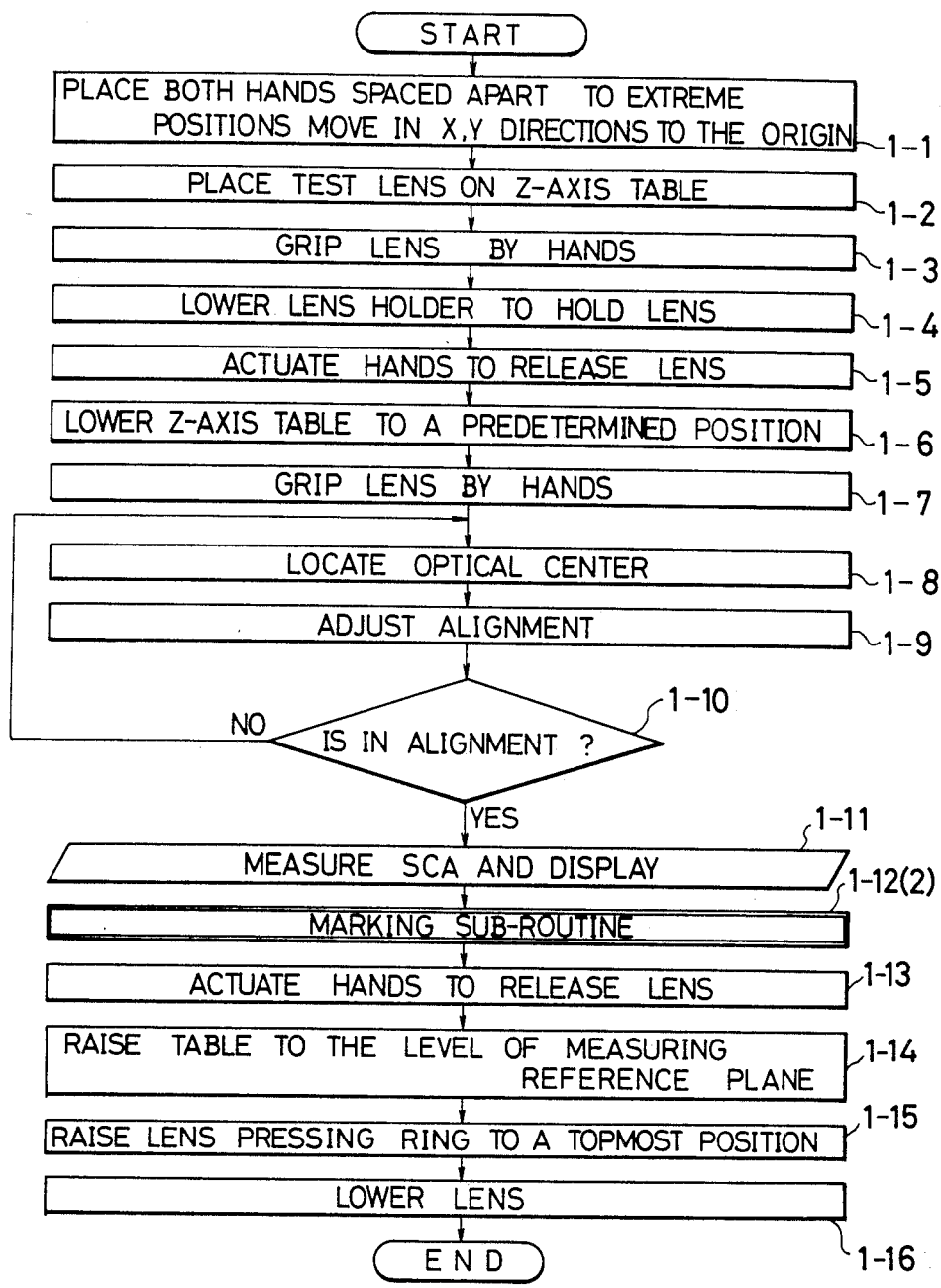
FIG. 22 is a flow chart showing an alignment-marking operation routine for an unedged lens.
Figure 23:
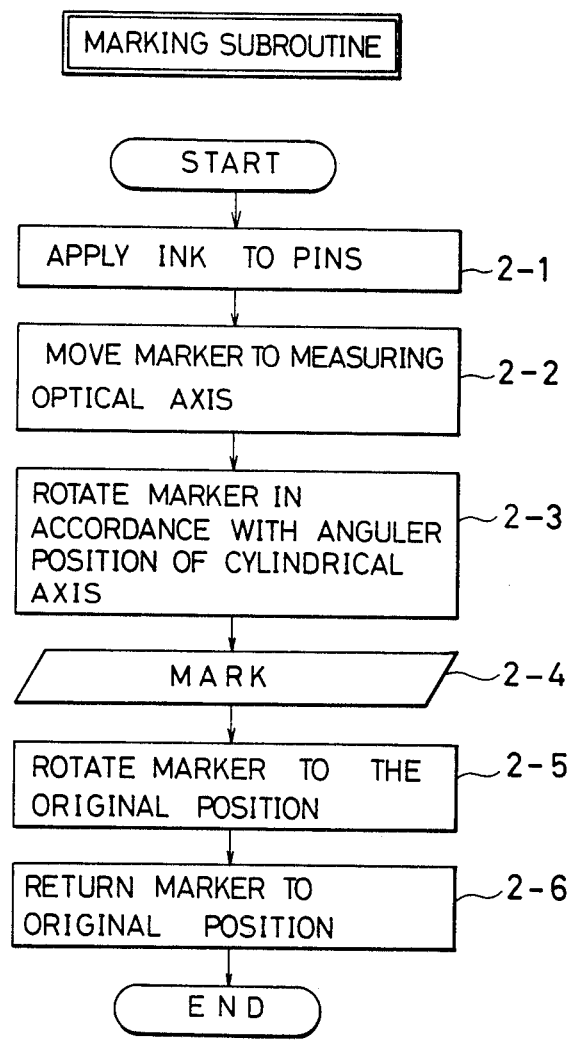
FIG. 23 is a flow chart showing a marking sub-routine.
Figure 24B:
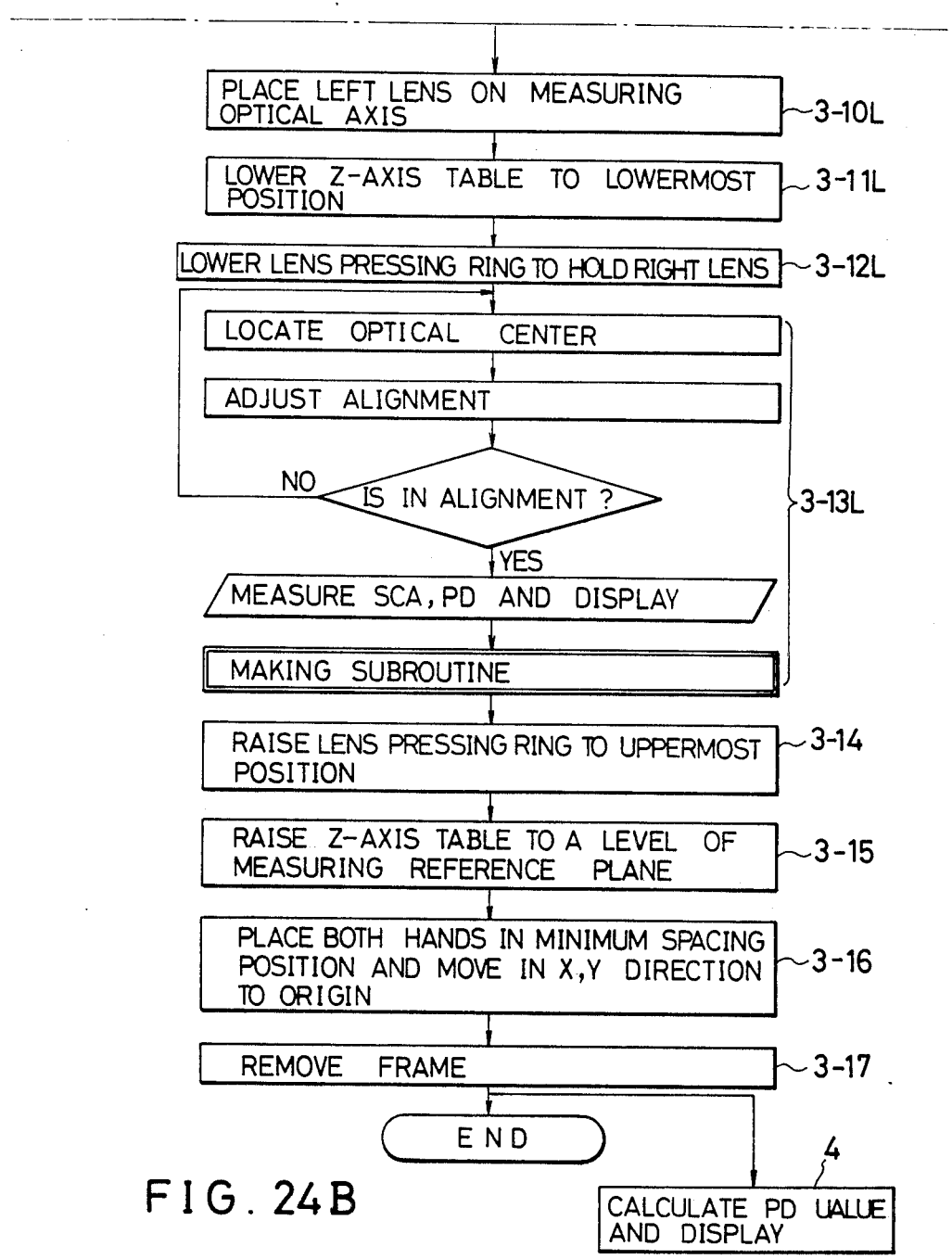
FIG. 24 is a flow chart showing an alignment-marking operation routine for a lens fitted in a spectacle frame.

FIGS. 19 to 21 are block diagrams of the computing control section E for controlling the operation of the alignment and marking sections described hereinbefore, while FIGS. 22 to 24 are flow charts of the operation sequence. The construction and operation of the computing control section will be described hereinunder in accordance with the steps of the flow chart.

(1) In case of the Unedged Spectacle Lens

The flow chart shown in FIG. 22 shows the flow of alignment and marking operation which applies to the case where the lens is an unedged lens. This flow is commenced as the operator switches a measurement mode switch 1402 to single lens mode S.

Step 1-1:

In response to an ON instruction from the switch 1402, the sequencer 1000 delivers an operation instruction to an initial control circuit 1108 through a signal line 1309. As shown in FIG. 20, the initial control circuit 1108 delivers a signal to an OR circuit 1152 of the control circuit 1112 for driving the arm, through a signal line 1212.

The OR circuit 1152 activates the voltage generating circuit 1149 through the signal line 1214 such as to apply a positive voltage to an operation amplifier 1140, thereby operating the arm driving D.C. motor 522 in forward or backward direction through the driver circuit 1132. A voltage generating circuit 1149 is constructed such as to apply a negative voltage to the operation amplifier 1140 thereby to drive the arm driving motor 522 in backward or forward direction. The values of the positive and negative voltages produced by the voltage generating circuit 1149 determines the driving current of the arm driving motor 522. Thus, the driving current for the motor 522 is controlled by logic signals supplied to the signal lines 1214 and 1215, thereby providing positive and negative driving torques. In the described example, the logic signals are inputted only through two signal lines 1214 and 1215. This, however, is only illustrative and the driving torque produced by the motor 522 can be varied in a multiplicity of stages by using a greater number of control lines such as to obtain output voltages of the voltage generating circuit 1149 in a multiplicity of stages both in the positive and negative modes. This basic circuit arrangement applies also to the voltage generating circuits 1150, 1151 and the operation amplifiers 1141, 1142 of later-mentioned control circuits 1110, 1111.

The voltage generating circuit 1149 which has received the signal from the signal line 1214 produces a voltage for driving the motor 522 clockwise, in order to move the hands 530 and 531 apart from each other. The clockwise direction of rotation of the motor 522 will be referred to as the forward direction, and the voltage for causing the forward rotation of the motor 522 will be referred to as positive voltage. The operation amplifier 1140 drives the motor 522 through the driver circuit 1132 such as to move the hands 530 and 531 apart from each other to the maximum degree of opening. When the hands 530 and 531 are moved apart to the maximum opening degree, a voltage is produced across a current detecting resistor $R_1$ such as to activate a comparator 1143, and the sequencer 1000 is informed of the fact that the hands 530 and 531 have been moved to the maximum degree, by means of pulses which are inputted and outputted through the signal line 1202.

In order to make the imaginary center formed by the hands 530, 531 align with the position of origin which is on the measuring optical axis, the initial control circuit 1108 reads the data concerning the numbers of pulses required for driving the X-axis driving motor 504 and the Y-axis driving motor 502 from an initial setting register 1107 (see FIG. 19), and delivers this data to driver circuits 1135, 1136 through the signal lines 1310, 1311.

In accordance with the thus delivered data concerning the numbers of pulses, the driver circuits 1135, 1136 operate to pass the pulses from the pulse generators 1114, 1115 to the X- and Y-axis driving motors 504 and 502 thereby driving these motors.

Upon completion of supply of pulses to the driver circuits 1135, 1136, the initial control circuit 1108 informs the sequencer 1000 of the completion of this step of operation through the signal line 1380.

Step 1-2:

The lens 4 is placed on the lens table 532 and the start switch 1401 is turned on.

Step 1-3:

The sequencer operates the OR circuit 1153 through the signal line 1201 (see FIG. 20). In this state, the signal from the initial control circuit has not been delivered to the OR circuits 1152, 1153 yet, so that only the OR circuit 1153 is operated to produce a signal which activates the voltage generating circuit 1149. The voltage generating circuit 1149 then produces a voltage for driving the arm driving motor 522 in counter-clockwise direction. This voltage is defined as being negative voltage. The operation amplifier 1140 inputs the negative voltage to the driver circuit 1132, so that the driver circuit 1132 rotates the motor 522, thereby causing the hands 530, 531 grip or clamp lens 4 at their first and second abutment surfaces 605a, 605b. The operation of the motor 522 is resisted because of griping of the lens 4, so that the load current is increased. This in turn produces a voltage across the current detecting resistor $R_1$ which in turn is delivered to the operation amplifier 1140, so that the motor 522 is driven with a constant current such as to cause the hands to grip the lens at a constant griping force. In response to the voltage produced across the current detecting resistor $R_1$, the comparator 1144 delivers pulses to the signal line 1203, thereby informing the sequencer 1000 of the fact that the lens has been griped safely.

Step 1-4:

Upon receipt of the pulses from the comparator 1144, the sequencer 1000 delivers pulses to the signal line 1204 thereby activating the control circuit 1110 which has a construction similar to that of the above-mentioned control circuit 1112. The control circuit 1110 in turn drives the lens pressing vertical driving motor 111 in the forward direction through the lens pressing motor driver 1130, such as to lower the lens pressing table 106, thereby causing the lens pressing ring 108 to press the lens 104. This motor 111 also is driven by a constant current under the control of the control circuit 1111, and the comparator 1145 delivers pulses to the signal line 1206 thereby informing the sequencer 1000 of the fact that the lens 4 has been pressed.

Step 1-5:

Upon receipt of the pulses from both the signal lines 1203 and 1206, the sequencer 1000 delivers pulses to the signal line 1200, such as to activate the OR circuit 1152. In consequence, the motor 522 is driven forwardly such as to move the hands 530 and 531 apart from each other, thereby ungriping or releasing the lens 4. The completion of the hand opening operation is detected by the comparator 1143 which delivers pulses to a signal line 1202 thus informing the sequencer 1000 of the completion of releasing.

Step 1-6:

In response to the pulses from the comparator 1145, the sequencer 1000 delivers a signal to the pulse generator 1116 through a signal line 1302. The pulse generator 1116 delivers a predetermined number of pulses to the Z-axis motor driver 1137, such as to forwardly drive the Z-axis motor 514, whereby the Z-axis table 501 is lowered to a predetermined position. Although the lens 4 is lowered as a result of the lowering of the z-axis table 501, the lens pressing motor 1111 operates to produce a constant force for pressing the lens 4 even during the lowering, because the control circuit 1110 for the lens pressing motor 111 operates to drive the motor 111 with a constant driving current.

In the course of the downward movement of the Z-axis table, the lens 4 is received by the lens holding pins 542 of the lens support member 541, and is clamped or held between the lens holding pins 542 and the pressing ring 108. When the Z-axis table has been lowered by a predetermined distance, i.e., when the pulse generator 1116 has produced a predetermined number of pulses, the sequencer 1000 detects the completion of lowering of the Z-axis table through a signal line 1320.

Step 1-7:

The lens 4 is again clamped or griped by the hands 530 and 531 by the same way as that in the step 1-3.

Step 1-8:

Then, the alignment of the lens is commenced. The sequencer 1000 delivers an instruction to the detection processing section 1101 for the measurement of the refraction characteristics of the lens. The detection processing section 1101 computes the Spherical refractive power S, the cylindrical power C, angle A of cylindrical axis, and the prism values $p_x$, $p_y$, of the lens in accordance with the data derived from the detector 1103, and delivers these values to the processing circuit 1102 for computing the amounts $h_x$ and $h_y$ of offset. The processing circuit 1102 constituted by a microcomputer for example computes the offset amounts in accordance with the formulae (2) and (5), and delivers the result to the comparator 1104.

In the case where the lens is a prism-finished lens or where a prism treatment is required, the prism values $(p_x, p_y)$ are inputted to the processing circuit 1102 through a keyboard 1121. In the case where the input of the prism values to the keyboard is made in terms of polar coordinate $(p, \theta)$, the inputted values are converted by the coordinate converter 1122 in accordance with the formula (4) into the values $(p_x, p_y)$ are then inputted to the processing circuit 1102. The computing circuit 1102 computes the offset amounts $h_x$ and $h_y$ in accordance with the formula (3) or (6) and the result of the computation is delivered to the comparator 1104.

Step 1-9:

The comparator 1104 compares the inputted offset amounts $h_x$ and $h_y$ with the allowable amounts $h'_x$, $h'_y$. When the measured offset amounts are smaller than these allowable offset amounts, the optical center of the lens or the optical point of action of the lens is substantially aligned with the measuring optical axis, i.e., it is judged that the alignment has been materially achieved. When either one of the conditions $h'_x < h_x$ and $h'_y < h_y$ is met, the comparator delivers pulses to the sequencer 1000 through the signal line 1303. The offset amounts $h'_x$ and $h'_y$ are computed by the processing section 1101 on the basis of the measured values of the refraction characteristics of the lens. For instance, in the case where the allowable range is given in terms of prism values as 0.2 prism diopter, the allowable offset amounts $h'_x$ and $h'_y$ can be computed by substituting 0.2 for the values $P_x$ and $P_y$ of the formula (2) or (5), and the thus computed allowable offset amounts $h'_x$ and $h'_y$ are inputted to the comparator as the reference allowable offset amounts.

The offset amounts $h_x$ and $h_y$ are received also by selector circuits 1105 and 1106, respectively. Upon receipt of the pulses from the signal line 1303, the sequencer 1000 causes, through signal lines 1304 and 1305, the selector circuits 1105, 1106 to conduct the selecting operation, thus allowing the offset amounts $h_x$ and $h_y$ to be delivered to the pulse generators 1114, 1115. The pulse generators 1114 and 1115 convert the inputted offset amounts $h_x$ and $h_y$ to corresponding numbers of pulses and deliver these pulses to the X-axis driving motor 504 and the Y-axis driving motor 502 through driver circuits 1135 and 1136. In consequence, the motors 504 and 502 are driven in such a way as to move the lens 4 clamped or griped by the hands 530 and 531 in the X- or Y-axis direction. Upon completion of outputting of the pulses, the pulse generators 1114, 1115 informs the completion to the sequencer through signal lines 1321, 1322.

Step 1-10:

Upon receipt of the pulse output completion signal from the pulse generators, the sequencers 1000 delivers to the processing section 1101 an instruction for measurement of the refraction characteristics. The new measured values of the refraction characteristics are inputted to the $h_x$, $h_y$ processing circuits 1102 which computes now offset amounts $h_x$, $h_y$ which are delivered to the comparator 1104 so as to be compared with the allowable offset amounts $h'_x$, $h'_y$ which are newly determined by the comparator 1104, whereby a judgement is made as to whether the offset amounts have been brought into the allowable ranges by the preceding cycle of alignment operation.

If the condition of $h'_x < h_x$ or $h'_y < h_y$ is met, a further alignment cycle is conducted in the same way as the step 1-9. This operation is continued until the condition of $h'_x \geq h_x$ or $h'_y \geq h_y$ is obtained.

Step 1-11:

When a judgement is made in the step 1-10 that the alignment operation is completed, the comparator 1104 delivers an alignment completion signal to the sequencer 1000 through the signal line 1323. Upon receipt of the alignment completion signal, the sequencer 1000 gives to the processing section 1101 an instruction for the display of the measured values of refraction characteristics on the display section DP and, as required, issues an instruction to the printer PR for the printing of the measured values of the refraction characteristics.

Step 1-12 Marking Sub-Routine 2

Step 2-1:

FIG. 23 is a flow chart showing the sub-routine for the marking operation. The sequencer 1000 activates the marking driver circuit 1134 through a signal line 1306. The marking driver circuit 1134 energizes the electromagnetic induction coil 326 of the marking unit 316 for a unit time, so that the marking styli 317 is lowered into the ink pot 323 thereby applying the ink to the end of the stylus 320.

Step 2-2:

The sequencer 1000 delivers, through a signal line 1208, instruction pulses to the control circuit 1111 which has a construction similar to that of the control circuit 1112 explained before. In response to the instruction pulses, a voltage generating circuit 1151 of the control circuit 1111 produces a positive voltage and delivers this voltage to an operation amplifier 1142, thereby moving the marking unit driving motor 307 forwardly through the driver circuit 1131. In consequence, the marking table 306 is lowered to bring the same to a predetermined position shown by imaginary lines in FIG. 14A, where the central marking stylus 317 of the marking unit 316 is aligned with the measuring optical axis L of the lensmeter. The sequencer 1000 is informed of the completion of the movement of the marking unit 316 by receiving an ON signal from a comparator 1147.

Step 2-3:

Upon receipt of the signal from the comparator 1147, the sequencer 1000 delivers the value $\theta$ of the cylinderical axis angle of the lens as measured by the processing section 1101 to a pulse generator 1113 through a signal line 1307. The pulse generator 1113 converts the inputted angle value $\theta$ into a pulse number and allows the marking unit rotating motor 321 by an amount corresponding to the number of pulses. As a reslt, the marking styli 317 of the marking unit 316 is rotated about the measuring optical axis L by the same angle $\theta$. After completion of delivery of the above-mentioned number of pulses, the pulse generator 1113 inputs a marking unit rotation completion signal to the sequencer 1000 through a signal line 1324.

Step 2-4:

Upon receipt of the marking unit rotation completion signal, the sequencer 1000 activates the marking driver circuit 1134 again through the signal line 1306, so that the driver circuit 1134 energizes the electromagnetic coil 326 of the marking unit 316 for a unit time, so that the marking styli 317 are lowered to contact the lens 4. In consequence, the ink on the end of the marking styli 317 is transferred to the lens surface, thus completing the marking operation.

Step 2-5:

After the completion of electric power supply to the coil 326 by the marking driver 1134, the sequencer 1000 delivers a signal to a pulse generator 1113 thereby causing the pulse generator 1113 to produce reversing pulses of a number corresponding to the cylinderical axis angle $\theta$. Upon receipt of the reversing pulses through the driver circuit 1133, the marking unit rotating motor 321 is reversed by an amount corresponding to the number of the reversing pulses, thereby resetting the marking unit 316 to the initial or original angular position.

Step 2-6:

Upon receipt of the signal from the pulse generator 1113 indicating that the marking unit has been reset to the original rotational position, the sequencer 1000 delivers a signal to the voltage generating circuit 1151 through the signal line 1209. The voltage generating circuit 1151 inputs the negative voltage to the operation amplifier 1142 thereby reversing the marking unit driving motor 307, whereby the marking table 306 is lifted and reset to the initial or original position. The completion of the resetting is detected as the ON signal from the comparator 1148 is received by the comparator 1148 through a signal line 1211.

Step 1-13:

Upon receipt of the signal from the comparator 1148, the sequencer 1000 delivers a signal to an OR circuit 1152 through a signal line 1200. In response to the output from the OR circuit 1152, the hands 530, 531 release the lens 4 in the same way as that in Step 1-5 explained before.

Step 1-14:

When the signal indicating the completion of the band opening operation is delivered to the sequencer 1000 from the comparator 1143 of the control circuit 1112, the sequencer 1000 activates the pulse generator 1116. The pulse generator 1116 generates reversing pulses of the same number as the pulses generated in Step 1-6 and delivers these pulses to the Z-axis driving motor 514 through the driver circuit 1137, thereby reversing the motor 514. In consequence, the Z-axis table is lifted to the same level as the measurement reference plane 540. In accordance with the rise of the Z-axis table, the lens is placed on the lens table 532, leaving the lens support member.

Step 1'-15:

Upon receipt of the signal indicating the completion of the Z-axis table, the sequencer 1000 activates the voltage generating circuit of the control circuit 1110 through the signal line 1205. The voltage generating circuit 1150 imparts a negative voltage to the operation amplifier 1141 such as to reverse the lens pressing vertical driving motor 111, thereby lifting the lens pressing table 106 to reset the same to the initial position. As a result of this upward movement, the lens pressing ring 4 releases the lens 4. The resetting of the lens pressing table 106 is detected by the sequencer 1000 which receives the ON signal from the comparator 1146. The sequencer 1000 then operates to display the completion of the measurement on the display section DP.

Step 1-16:

The operator then takes the lens with which the measurement and marking have been finished off the lens table 532.

In the foregoing description, D.C. motors are used as the arm driving motor 522, lens pressing vertically driving motor 111 and the marking unit driving motor 307. These motors, however, may be constituted by torque motors. The marking unit driving motor 307 in particular may be constituted by a stepping motor. The comparators 1143 to 1148 employed for detection of constant driving current for the purpose of keeping the lens contact pressure constant may be substituted by timers or limit switches which are incorporated in the driving mechanism. A D.C. motor can be used as the Z-axis motor provided that a suitable position detecting switch is used.

(2) In the Case of Lens Fitted in Spectacle Frame

The alignment-marking operations for a lens fitted in a spectacle frame will be explained hereinunder with reference to FIG. 24 showing a flow chart.

In this case, the operation is commenced as the operator turns the measuring mode change-over switch 1402 to the framed lens measuring mode F.

Step 3-1:

The sequencer 1000 delivers a signal to the initial control circuit 1108 through a signal line 1309. Upon receipt of this signal, the initial control circuit 1108 delivers a signal to the OR circuit 1153 through a signal line 1213 shown in FIG. 20. The OR circuit 1153 activates the voltage generating circuit 1149 thereby inputting the negative voltage to the operation amplifier 1140, thus reversing the arm driving motor 522 through the driver circuit 1132, so that the distance between the hands 530 and 531 is reduced to a predetermined value, for instance, minimum spacing value. The fact that the distance between the hands 530 and 531 has been reduced to the predetermined value is detected by the sequencer 1000 which receives the signal from a comparator 1144.

Then, the sequencer 1000 delivers to the inital control circuit 1108 an instruction for making the circuit 1108 read the origin position data of the hands stored in the initial setting register 1107. In accordance with the thus read date, the control circuit 1108 operates the X-axis motor 504 and the Y-axis motor 502 in the same manner as that in Step 1-1 mentioned before, thus resetting the hands to the original positions.

Step 3-2:

The operator puts or places the spectacle frame FM on the hands 530, 531, preferably in such a manner that the lower edges of the lens frame FR of the spectacle frame FM abuts the frame abutment surfaces of the hands. After setting the spectacle frame in this manner, the operator turns the start switch 1401 ON.

Step 3-3:

Upon receipt of the ON signal from the start switch 1401, the sequencer 1000 inputs a signal to the OR circuit 1152. The OR circuit 1152 then activates the voltage generator 1149 thereby supplying a positive voltage to the current amplifier 1140, so that the motor 522 operates in the forward direction to move the hands 530 and 531 apart from each other. As a result, the outer surfaces 605d of the hands 530 and 531 contact the temple portions FT of the frame FM, thereby holding the frame FM on the bands. The operation for holding the frame is carried out through driving by constant driving current as in the case of the unedged lens.

Step 3-4R:

The completion of holding of the frame is detected by the sequencer 1000 through the receipt of a signal from the comparator 1143. Then, the sequencer 1000 inputs an instruction signal to a frame locating controller 1120, such as to set the right-eye lens in the frame on the measuring optical system 1103. FIG. 21 shows the construction of the frame locating controller 1120.

First of all, the sequencer 1000 delivers a reading signal to a right lens set data register 1160 through a signal line 1350. In response to this reading signal, the right lens set data register 1160 delivers to a driver circuit 1135 pulses of a number corresponding to the half PD value of standard spectacle frame. The driver circuit 1135 causes a forward rotation of the X-axis motor 504 by an amount corresponding to the above-mentioned number of pulses, and displaces the arm base 520 to the left thereby placing the right lens at a position above the lens support member. After completion of the outputting of the above-mentioned number of pulses, the right lens set data register informs the completion to the sequencer through a signal line 1351.

Step 3-5R:

Upon receipt of the signal indicating the completion of outputting of pulses from the right lens set data register 1160, the sequencer 1000 delivers an instruction to a pulse generator 1116 which produces a predetermined number of pulses. Upon receipt of these pulses, the Z-axis motor 514 is driven forwardly such as to lower the Z-axis table 501 to the lowermost position. In consequence, the right lens of the spectacle frame FM is placed on the lens holding pins 542 of the lens support member 541.

Step 3-6R:

As in the case of Step 1-4 explained before, the lens pressing ring 108 presses the right lens and holds the same in cooperation with the lens supporting member 541.

Step 3-7R:

In this step, the operation which is the same as that in Steps 1-8 through 1-12 for the unedged lens is performed. It is to be noted, however, that the pulses from the pulse generator 1114 is continuously counted by the right lens counter 1162 of a frame locating controller 1120, for the purpose of PD measurement which will be explained later. In order that the counting of the right lens counter 1162 is stopped simultaneously with the completion of the marking routine, the sequencer inputs a counter stop signal to the counter 1162 through a signal line 1356.

Step 3-8:

The sequencer 1000 then instructs the voltage generating circuit 1150 of the control circuit 1110 such that a negative voltage is supplied to the operation amplifier 1141, so as to reverse the lens pressing vertical driving motor 111 thereby resetting the lens pressing table to the initial position. Consequently, the lens pressing ring releases the right lens.

Step 3-9:

Then, the sequencer 1000 passes a predetermined number of pulses from the pulse generator 1116 to the Z-axis motor 514, so as to reverse the Z-axis motor 514 thereby lifting or raising the Z-axis table to a level of a reference reset position corresponding to the number of pulses.

The alignment, marking and measurement of refraction characteristics are thus finished with the right lens, and the process proceeds to the measurement of refraction characteristics of the left lens.

Step 3-10L:

The sequencer 1000 gives an instruction through a signal line 1352 to a left lens set data register 1161 of a frame locating controller 1120. In response to this instruction, the register 1161 delivers pulses of a number corresponding to the total PD value of a standard spectacle frame stored therein to a driver circuit 1135 which in turn drives the X-axis motor 514 such as to move the arm base to the right, thus positioning the left lens on the lens support member 541.

Steps 3-11L to 3-15:

The same operation as that in Steps 3-5R through 3-9 is performed. It is to be noted, however, that the delivery of pulses from the pulse generator 1114 to the left lens counter 1163 in the frame locating controller 1120 is ceased simultaneously with the completion of marking in the step 3-13L.

Step 3-16:

The sequencer 1000 instructs the pulse generators 1114 and 1115 such as to drive the X-axis motor 504 and the Y-axis motor 502, thus resetting or replacing the hands 530 and 531 to the position of origin. Then, a signal is inputted to an OR circuit 1153 through a signal line 1201, so that the arm driving motor 522 is reversed to move the hands 530 and 531 towards each other.

Step 3-17:

The operator demounts or removes the spectacle frame from the hands, thus finishing the measurement.

Step 4:

The sequencer 1000 gives an instruction to an adder 1164 of the frame locating controller 1120, so that the adder operates to compute or calculate the sum of the number counted by the right lens counter 1162 and the number counted by the left lens counter 1163. The output of the adder 1164 representing the sum is converted to the PD value by a PD converter 1165, the result of which is displayed on the display section DP and, if necessary, printed out by the printer PR.

We claim:

1. An automatic marking device for a lensmeter including a measuring system having a measuring optical axis and adapted for measuring refractive characteristics of a lens to be tested, said marking device, comprising:
a lens support member;
lens holding means having a lens holding member cooperative with said lens support member for clamping said lens between said support member and said holding means, said lens being movable in a plane substantially perpendicular to (a) said measuring optical axis of said lensmeter;
marking means having a marking unit movably mounted on said lens holding means and having at least one marking stylus, said marking unit being carried for rotation about an axis which is parallel to said measuring optical axis;
a plurality of hands having inner surfaces adapted for contacting adjacent edges of said lens to clamp said lens between said hands; and
hand moving means for moving said hands in said plane according to measurement of the refractive characteristics of said lens measured by said measuring system of said marking device.

2. An automatic marking device for a lensmeter according to claim 1, wherein said hands are provided with outer surfaces for contacting the temple portions of a spectacle frame.

3. A marking device for a lensmeter according to claim 1, wherein said hand moving means is mounted on a carriage which is movable in a direction parallel to said measuring optical axis, said carriage being constituted by a lens table having an aperture adapted to allow said lens support member to pass therethrough.

4. An automatic marking device for a lensmeter according to claim 1, wherein said hand moving means includes a hand interval changing means for supporting said hands and changing the interval between said hands, and a moving and holding means for holding said hand interval changing means and moving the same in said plane.

5. An automatic marking device for a lensmeter according to claim 4, wherein said hand interval changing means includes moving means for moving said two hands in opposite directions, a D.C. motor for driving said moving means, and a constant-current driving circuit for driving said D.C. motor with a constant torque when said hands have clamped the lens.

6. An automatic marking device for a lensmeter according to claim 1, wherein said lens holding means includes a lens pressing table carrying said lens holding member such that said lens holding member is movable in the direction parallel to the measuring optical axis, moving means for moving said lens pressing table, a D.C. motor for driving said moving means, and a constant-current driving circuit for driving said D.C. motor at a constant torque so that said lens pressing member can press said lens always with a constant pressure, and said lens pressing table is supported said marking section.

7. An automatic alignment apparatus for a lensmeter including a measuring system having a measuring optical axis and adapted for measuring refractive characteristics of a lens to be tested, said apparatus, comprising:
a lens support member;
lens holding means having a lens holding member which cooperates with the lens support member for clamping the lens between said support member and said holding means, said lens being movable in a plane substantially perpendicular to the measuring optical axis of the lensmeter;
a plurality of hands having inner surfaces for contacting the edge of the lens to clamp the lens between said hands; and
hand moving means for moving the hands in the plane according to the refractive characteristics of the lens measured by said measuring system of the marking device.

8. An automatic alignment apparatus for a lensmeter according to claim 7, wherein said hands are provided with outer surfaces for contacting the temple portions of a spectacle frame.

9. An automatic alignment apparatus for a lensmeter according to claim 7, wherein said hand moving means includes a hand interval varying means for supporting said hands and changing the interval between said hands, and a moving and holding means for holding said hand interval changing means and moving the same in said plane.

10. An automatic alignment apparatus for a lensmeter according to claim 9, wherein said hand interval changing means includes moving means for moving said two hands in opposite direction, a D.C. motor for driving said moving means, and a constant-current driving circuit for driving said D.C. motor with a constant torque when said hands have clamped the lens.

11. An automatic alignment apparatus for a lensmeter according to claim 7, wherein said lens holding means includes alens pressing table carrying said lens holding member such that said lens holding member is movable in the direction parallel to the measuring optical axis, moving means for moving said lens pressing table, a D.C. motor for driving said moving means, and a constant-current driving circuit for driving said D.C. motor at a constant torque so that said lens pressing member can press said lens always with a constant pressure.

* * * * *

UNITED STATES PATENT AND TRADEMARK OFFICE
CERTIFICATE OF CORRECTION

PATENT NO. : 4,676,004

DATED : June 30, 1987

INVENTOR(S) : Nakamura et al.

It is certified that error appears in the above-identified patent and that said Letters Patent is hereby corrected as shown below:

First page, Item [56], after "References Cited U.S. Patent Documents" insert the following:

```
--2,878,567  3-1959  Hofman
  2,930,130  3-1960  Ray, et al.
  4,571,842  2-1986  Ikezawa et al.
  4,309,826  1-1982  Negroni--
```

Signed and Sealed this

Nineteenth Day of April, 1988

Attest:

DONALD J. QUIGG

*Attesting Officer*              *Commissioner of Patents and Trademarks*